(12) United States Patent
Herrington et al.

(10) Patent No.: US 9,197,943 B2
(45) Date of Patent: *Nov. 24, 2015

(54) ELECTRONIC PROGRAM GUIDE WITH RELATED-PROGRAM SEARCH FEATURE

(71) Applicant: Rovi Guides, Inc., Santa Clara, CA (US)

(72) Inventors: W. Benjamin Herrington, Tulsa, OK (US); Michael D. Ellis, Boulder, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,289

(22) Filed: Mar. 19, 2013

(65) Prior Publication Data

US 2013/0298166 A1    Nov. 7, 2013

Related U.S. Application Data

(63) Continuation of application No. 11/894,769, filed on Aug. 20, 2007, now abandoned, which is a continuation of application No. 10/852,913, filed on May 24, 2004, now abandoned, which is a
(Continued)

(51) Int. Cl.
| | |
|---|---|
| *H04N 21/482* | (2011.01) |
| *H04N 21/466* | (2011.01) |
| *H04N 21/45* | (2011.01) |
| *H04N 21/454* | (2011.01) |
| *H04N 21/4722* | (2011.01) |
| *H04N 21/4725* | (2011.01) |
| *H04N 21/475* | (2011.01) |
| *H04N 5/445* | (2011.01) |
| *H04N 21/472* | (2011.01) |
| *H04N 21/488* | (2011.01) |

(52) U.S. Cl.
CPC ....... *H04N 21/4828* (2013.01); *H04N 5/44543* (2013.01); *H04N 21/45* (2013.01); *H04N 21/454* (2013.01); *H04N 21/4532* (2013.01); *H04N 21/466* (2013.01); *H04N 21/4668* (2013.01);
(Continued)

(58) Field of Classification Search
None
See application file for complete search history.

(56) References Cited

U.S. PATENT DOCUMENTS

| | | | |
|---|---|---|---|
| 4,024,401 A | 5/1977 | Bernstein et al. | |
| 4,081,753 A | 3/1978 | Miller | |

(Continued)

FOREIGN PATENT DOCUMENTS

| | | |
|---|---|---|
| CA | 2345161 A1 | 6/1994 |
| CN | 1200221 A | 11/1998 |

(Continued)

OTHER PUBLICATIONS

A Financial Times Survey: Viewdata (Advertisement), Financial Times, Mar. 20, 1979.
(Continued)

*Primary Examiner* — Justin Shepard
(74) *Attorney, Agent, or Firm* — Ropes & Gray LLP

(57) ABSTRACT

A system for searching for programs is provided. The system may allow the user to indicate an interest in a given program and to request that the system locate programs related to the given program. The system may locate program listings related to the given program (e.g., based on attributes of the given program), display a list of located listings and allow the user to select listings from the list. For a program selected from the list, the system may tune to the program, may display an information display screen for the program, etc. The system may allow the user to configure and save search parameters, sort related program listings based on the attributes of the given program. For a saved search, the system may allow the user to retrieve the search to locate currently available program listings, receive automatic notifications of programs matching the search, modify the search, etc.

29 Claims, 20 Drawing Sheets

Related U.S. Application Data continuation of application No. 09/451,612, filed on Nov. 30, 1999, now Pat. No. 6,865,746.

(60) Provisional application No. 60/110,989, filed on Dec. 3, 1998.

(52) U.S. Cl.
CPC ....... *H04N 21/4722* (2013.01); *H04N 21/4725* (2013.01); *H04N 21/4755* (2013.01); *H04N 21/4756* (2013.01); *H04N 21/482* (2013.01); *H04N 21/47214* (2013.01); *H04N 21/4882* (2013.01)

(56) References Cited

U.S. PATENT DOCUMENTS

| | | |
|---|---|---|
| 4,170,782 A | 10/1979 | Miller |
| 4,271,532 A | 6/1981 | Wine |
| 4,280,148 A | 7/1981 | Saxena |
| 4,300,040 A | 11/1981 | Gould et al. |
| 4,367,559 A | 1/1983 | Tults |
| 4,375,651 A | 3/1983 | Templin et al. |
| 4,381,522 A | 4/1983 | Lambert |
| 4,385,210 A | 5/1983 | Marquiss |
| 4,390,901 A | 6/1983 | Keiser |
| 4,425,579 A | 1/1984 | Merrell |
| 4,429,385 A | 1/1984 | Cichelli et al. |
| 4,495,654 A | 1/1985 | Deiss |
| 4,527,194 A | 7/1985 | Sirazi |
| 4,605,973 A | 8/1986 | Von Kohorn |
| 4,625,080 A | 11/1986 | Scott |
| 4,641,205 A | 2/1987 | Beyers, Jr. |
| 4,645,873 A | 2/1987 | Chomet |
| 4,677,501 A | 6/1987 | Saltzman et al. |
| 4,689,022 A | 8/1987 | Peers et al. |
| 4,691,351 A | 9/1987 | Hayashi et al. |
| 4,694,490 A | 9/1987 | Harvey et al. |
| 4,706,121 A | 11/1987 | Young |
| 4,751,578 A | 6/1988 | Reiter et al. |
| 4,754,326 A | 6/1988 | Kram et al. |
| 4,761,684 A | 8/1988 | Clark et al. |
| 4,787,063 A | 11/1988 | Muguet |
| 4,882,732 A | 11/1989 | Kaminaga |
| 4,908,707 A | 3/1990 | Kinghorn |
| 4,908,713 A | 3/1990 | Levine |
| 4,959,719 A | 9/1990 | Strubbe et al. |
| 4,963,994 A | 10/1990 | Levine |
| 4,965,825 A | 10/1990 | Harvey et al. |
| 4,977,455 A | 12/1990 | Young |
| 5,016,273 A | 5/1991 | Hoff |
| 5,027,400 A | 6/1991 | Baji et al. |
| 5,036,314 A | 7/1991 | Barillari et al. |
| 5,038,211 A | 8/1991 | Hallenbeck |
| 5,046,092 A | 9/1991 | Walker et al. |
| 5,047,867 A | 9/1991 | Strubbe et al. |
| 5,075,771 A | 12/1991 | Hashimoto |
| 5,089,885 A | 2/1992 | Clark |
| 5,090,049 A | 2/1992 | Chen |
| 5,113,259 A | 5/1992 | Romesburg et al. |
| 5,126,851 A | 6/1992 | Yoshimura et al. |
| 5,132,992 A | 7/1992 | Yurt et al. |
| 5,151,789 A | 9/1992 | Young |
| 5,155,591 A | 10/1992 | Wachob |
| 5,170,388 A | 12/1992 | Endoh |
| 5,179,439 A | 1/1993 | Hashimoto et al. |
| 5,187,589 A | 2/1993 | Kono et al. |
| 5,189,630 A | 2/1993 | Barstow et al. |
| 5,191,423 A | 3/1993 | Yoshida et al. |
| 5,195,134 A | 3/1993 | Inoue et al. |
| 5,210,611 A | 5/1993 | Yee et al. |
| 5,223,924 A | 6/1993 | Strubbe |
| 5,231,494 A | 7/1993 | Wachob |
| 5,233,423 A | 8/1993 | Jernigan et al. |
| 5,253,066 A | 10/1993 | Vogel |
| 5,262,860 A | 11/1993 | Fitzpatrick et al. |
| 5,283,819 A | 2/1994 | Glick et al. |
| 5,293,357 A | 3/1994 | Hallenbeck |
| 5,295,242 A | 3/1994 | Mashruwala et al. |
| 5,296,931 A | 3/1994 | Na |
| 5,297,204 A | 3/1994 | Levine |
| 5,317,403 A | 5/1994 | Keenan |
| 5,323,240 A | 6/1994 | Amano et al. |
| 5,325,238 A | 6/1994 | Stebbings et al. |
| 5,325,423 A | 6/1994 | Lewis |
| 5,335,277 A | 8/1994 | Harvey et al. |
| 5,347,632 A | 9/1994 | Filepp et al. |
| 5,353,121 A | 10/1994 | Young et al. |
| 5,359,367 A | 10/1994 | Stockill |
| 5,371,551 A | 12/1994 | Logan et al. |
| 5,382,983 A | 1/1995 | Kwoh et al. |
| 5,396,546 A | 3/1995 | Remillard |
| 5,398,138 A | 3/1995 | Tomita |
| 5,410,326 A | 4/1995 | Goldstein |
| 5,410,344 A | 4/1995 | Graves et al. |
| 5,410,367 A | 4/1995 | Zahavi et al. |
| 5,412,720 A | 5/1995 | Hoarty |
| 5,414,756 A | 5/1995 | Levine |
| 5,432,561 A | 7/1995 | Strubbe |
| 5,438,355 A | 8/1995 | Palmer |
| 5,444,499 A | 8/1995 | Saitoh |
| 5,446,919 A | 8/1995 | Wilkins |
| 5,455,570 A | 10/1995 | Cook et al. |
| 5,457,478 A | 10/1995 | Frank |
| 5,465,113 A | 11/1995 | Gilboy |
| 5,465,385 A | 11/1995 | Ohga et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,488,409 A | 1/1996 | Yuen et al. |
| 5,502,504 A | 3/1996 | Marshall et al. |
| 5,515,106 A | 5/1996 | Chaney et al. |
| 5,515,511 A | 5/1996 | Nguyen et al. |
| 5,517,254 A | 5/1996 | Monta et al. |
| 5,517,256 A | 5/1996 | Hashimoto |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,534,911 A | 7/1996 | Levitan |
| 5,543,933 A | 8/1996 | Kang et al. |
| 5,544,321 A | 8/1996 | Theimer et al. |
| 5,550,576 A | 8/1996 | Klosterman |
| 5,550,578 A | 8/1996 | Hoarty et al. |
| 5,550,863 A | 8/1996 | Yurt et al. |
| 5,553,221 A | 9/1996 | Reimer et al. |
| 5,559,548 A | 9/1996 | Davis et al. |
| 5,559,549 A | 9/1996 | Hendricks et al. |
| 5,559,550 A | 9/1996 | Mankovitz |
| 5,561,709 A | 10/1996 | Remillard |
| 5,563,665 A | 10/1996 | Chang |
| 5,570,295 A | 10/1996 | Isenberg et al. |
| 5,572,332 A | 11/1996 | Shin |
| 5,572,442 A | 11/1996 | Schulhof et al. |
| 5,576,755 A | 11/1996 | Davis et al. |
| 5,579,239 A | 11/1996 | Freeman et al. |
| 5,583,560 A | 12/1996 | Florin et al. |
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,490 A | 1/1997 | Dawson et al. |
| 5,594,509 A | 1/1997 | Florin et al. |
| 5,594,661 A | 1/1997 | Bruner et al. |
| 5,596,373 A | 1/1997 | White et al. |
| 5,596,705 A | 1/1997 | Reimer et al. |
| 5,600,364 A | 2/1997 | Hendricks et al. |
| 5,606,374 A | 2/1997 | Bertram |
| 5,616,876 A | 4/1997 | Cluts |
| 5,617,526 A | 4/1997 | Oran et al. |
| 5,617,565 A | 4/1997 | Augenbraun et al. |

(56) References Cited

U.S. PATENT DOCUMENTS

| | | | |
|---|---|---|---|
| 5,619,249 A | 4/1997 | Billock et al. |
| 5,621,456 A | 4/1997 | Florin et al. |
| 5,623,613 A | 4/1997 | Rowe et al. |
| 5,625,693 A | 4/1997 | Rohatgi et al. |
| 5,629,733 A | 5/1997 | Youman et al. |
| 5,630,119 A | 5/1997 | Aristides et al. |
| 5,631,995 A | 5/1997 | Weissensteiner et al. |
| 5,635,978 A | 6/1997 | Alten et al. |
| 5,635,979 A | 6/1997 | Kostreski et al. |
| 5,635,989 A | 6/1997 | Rothmuller |
| 5,640,484 A | 6/1997 | Mankovitz |
| 5,654,748 A | 8/1997 | Matthews, III |
| 5,657,072 A | 8/1997 | Aristides et al. |
| 5,659,742 A | 8/1997 | Beattie et al. |
| 5,663,757 A | 9/1997 | Morales |
| 5,666,293 A | 9/1997 | Metz et al. |
| 5,666,645 A | 9/1997 | Thomas et al. |
| 5,671,411 A | 9/1997 | Watts et al. |
| 5,675,390 A | 10/1997 | Schindler et al. |
| 5,677,708 A | 10/1997 | Matthews, III et al. |
| 5,677,981 A | 10/1997 | Kato et al. |
| 5,682,206 A | 10/1997 | Wehmeyer et al. |
| 5,682,525 A | 10/1997 | Bouve et al. |
| 5,684,525 A | 11/1997 | Klosterman |
| 5,686,954 A | 11/1997 | Yoshinobu et al. |
| 5,689,663 A | 11/1997 | Williams |
| 5,691,476 A | 11/1997 | Madaras |
| 5,692,214 A | 11/1997 | Levine |
| 5,694,163 A | 12/1997 | Harrison |
| 5,694,176 A | 12/1997 | Bruette et al. |
| 5,696,905 A | 12/1997 | Reimer et al. |
| 5,699,052 A | 12/1997 | Miyahara |
| 5,699,107 A | 12/1997 | Lawler et al. |
| 5,699,528 A | 12/1997 | Hogan |
| 5,708,767 A | 1/1998 | Yeo et al. |
| 5,708,780 A | 1/1998 | Levergood et al. |
| 5,710,601 A | 1/1998 | Marshall et al. |
| 5,710,884 A | 1/1998 | Dedrick |
| 5,717,923 A | 2/1998 | Dedrick |
| 5,722,041 A | 2/1998 | Freadman |
| 5,724,103 A | 3/1998 | Batchelor |
| 5,724,567 A | 3/1998 | Rose et al. |
| 5,726,702 A | 3/1998 | Hamaguchi et al. |
| 5,731,844 A | 3/1998 | Rauch et al. |
| 5,734,853 A | 3/1998 | Hendricks et al. |
| 5,734,893 A | 3/1998 | Li et al. |
| 5,737,552 A | 4/1998 | Lavallee et al. |
| 5,740,549 A | 4/1998 | Reilly et al. |
| 5,742,816 A | 4/1998 | Barr et al. |
| 5,745,710 A | 4/1998 | Clanton, III et al. |
| 5,748,191 A | 5/1998 | Rozak et al. |
| 5,748,716 A | 5/1998 | Levine |
| 5,749,081 A | 5/1998 | Whiteis |
| 5,751,282 A | 5/1998 | Girard et al. |
| 5,752,160 A | 5/1998 | Dunn |
| 5,754,939 A | 5/1998 | Herz et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,606 A | 6/1998 | Wolzien |
| 5,768,528 A | 6/1998 | Stumm |
| 5,774,357 A | 6/1998 | Hoffberg et al. |
| 5,774,664 A | 6/1998 | Hidary et al. |
| 5,774,859 A | 6/1998 | Houser et al. |
| 5,778,181 A | 7/1998 | Hidary et al. |
| 5,781,246 A | 7/1998 | Alten et al. |
| 5,781,734 A | 7/1998 | Ohno et al. |
| 5,787,259 A | 7/1998 | Haroun et al. |
| 5,788,507 A | 8/1998 | Redford et al. |
| 5,790,198 A | 8/1998 | Roop et al. |
| 5,790,201 A | 8/1998 | Antos |
| 5,790,202 A | 8/1998 | Kummer et al. |
| 5,790,753 A | 8/1998 | Krishnamoorthy et al. |
| 5,793,964 A | 8/1998 | Rogers et al. |
| 5,793,972 A | 8/1998 | Shane et al. |
| 5,798,785 A * | 8/1998 | Hendricks et al. ............... 725/46 |
| 5,801,747 A | 9/1998 | Bedard |
| 5,805,763 A | 9/1998 | Lawler et al. |
| 5,805,806 A | 9/1998 | McArthur |
| 5,809,214 A | 9/1998 | Nureki et al. |
| 5,809,242 A | 9/1998 | Shaw et al. |
| 5,809,471 A | 9/1998 | Brodsky |
| 5,812,124 A | 9/1998 | Eick et al. |
| 5,812,931 A | 9/1998 | Yuen |
| 5,815,145 A | 9/1998 | Matthews, III |
| 5,818,441 A | 10/1998 | Throckmorton et al. |
| 5,818,511 A | 10/1998 | Farry et al. |
| 5,818,935 A | 10/1998 | Maa |
| 5,819,156 A | 10/1998 | Belmont |
| 5,819,285 A | 10/1998 | Damico et al. |
| 5,822,123 A | 10/1998 | Davis et al. |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,832,223 A | 11/1998 | Hara et al. |
| 5,833,468 A | 11/1998 | Guy et al. |
| 5,835,717 A | 11/1998 | Karlton et al. |
| 5,838,383 A | 11/1998 | Chimoto et al. |
| 5,844,552 A | 12/1998 | Gaughan et al. |
| 5,844,620 A | 12/1998 | Coleman et al. |
| 5,848,396 A | 12/1998 | Gerace |
| 5,850,218 A | 12/1998 | LaJoie et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,867,226 A | 2/1999 | Wehmeyer et al. |
| 5,867,233 A | 2/1999 | Tanaka et al. |
| 5,870,754 A | 2/1999 | Dimitrova et al. |
| 5,873,660 A | 2/1999 | Walsh et al. |
| 5,875,108 A | 2/1999 | Hoffberg et al. |
| 5,877,906 A | 3/1999 | Nagasawa et al. |
| 5,880,720 A | 3/1999 | Iwafune et al. |
| 5,880,768 A | 3/1999 | Lemmons et al. |
| 5,886,732 A | 3/1999 | Humpleman |
| 5,889,950 A | 3/1999 | Kuzma |
| 5,890,138 A | 3/1999 | Godin et al. |
| 5,892,536 A | 4/1999 | Logan et al. |
| 5,892,767 A | 4/1999 | Bell et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,865 A | 5/1999 | Palmer et al. |
| 5,907,322 A | 5/1999 | Kelly et al. |
| 5,907,323 A | 5/1999 | Lawler et al. |
| 5,912,664 A | 6/1999 | Eick et al. |
| 5,914,712 A | 6/1999 | Sartain et al. |
| 5,914,746 A | 6/1999 | Matthews, III et al. |
| 5,915,026 A | 6/1999 | Mankovitz |
| 5,915,250 A | 6/1999 | Jain et al. |
| 5,918,213 A | 6/1999 | Bernard et al. |
| 5,920,842 A | 7/1999 | Cooper et al. |
| 5,922,071 A | 7/1999 | Taylor et al. |
| 5,923,848 A | 7/1999 | Goodhand et al. |
| 5,929,849 A | 7/1999 | Kikinis |
| 5,929,932 A | 7/1999 | Otsuki et al. |
| 5,931,905 A | 8/1999 | Hashimoto et al. |
| 5,937,160 A | 8/1999 | Davis et al. |
| 5,940,073 A | 8/1999 | Klosterman et al. |
| 5,946,386 A | 8/1999 | Rogers et al. |
| 5,946,678 A * | 8/1999 | Aalbersberg ........................... 1/1 |
| 5,949,954 A | 9/1999 | Young et al. |
| 5,955,988 A | 9/1999 | Blonstein et al. |
| 5,956,716 A | 9/1999 | Kenner et al. |
| 5,973,683 A | 10/1999 | Cragun et al. |
| 5,977,964 A | 11/1999 | Williams et al. |
| 5,983,236 A | 11/1999 | Yager et al. |
| 5,987,213 A | 11/1999 | Mankovitz et al. |
| 5,988,078 A | 11/1999 | Levine |
| 5,990,927 A | 11/1999 | Hendricks et al. |
| 5,991,799 A | 11/1999 | Yen et al. |
| 6,002,394 A | 12/1999 | Schein et al. |

(56) References Cited

U.S. PATENT DOCUMENTS

| | | | |
|---|---|---|---|
| 6,002,443 A | 12/1999 | Iggulden | |
| 6,002,444 A | 12/1999 | Marshall et al. | |
| 6,003,030 A | 12/1999 | Kenner et al. | |
| 6,005,561 A | 12/1999 | Hawkins et al. | |
| 6,005,563 A | 12/1999 | White et al. | |
| 6,005,565 A | 12/1999 | Legall et al. | |
| 6,005,597 A | 12/1999 | Barrett et al. | |
| 6,006,257 A | 12/1999 | Slezak | |
| 6,008,802 A | 12/1999 | Iki et al. | |
| 6,008,803 A | 12/1999 | Rowe et al. | |
| 6,012,086 A | 1/2000 | Lowell | |
| 6,014,184 A | 1/2000 | Knee et al. | |
| 6,016,141 A | 1/2000 | Knudson et al. | |
| 6,018,372 A | 1/2000 | Etheredge | |
| 6,020,883 A | 2/2000 | Herz et al. | |
| 6,023,267 A | 2/2000 | Chapuis et al. | |
| 6,025,837 A | 2/2000 | Matthews, III et al. | |
| 6,029,195 A | 2/2000 | Herz | |
| 6,035,091 A | 3/2000 | Kazo | |
| 6,058,238 A | 5/2000 | Ng | |
| 6,065,047 A | 5/2000 | Carpenter et al. | |
| 6,067,561 A | 5/2000 | Dillon | |
| 6,072,460 A | 6/2000 | Marshall et al. | |
| 6,075,526 A | 6/2000 | Rothmuller | |
| 6,078,348 A | 6/2000 | Klosterman et al. | |
| 6,081,750 A | 6/2000 | Hoffberg et al. | |
| 6,088,722 A | 7/2000 | Herz et al. | |
| 6,091,883 A | 7/2000 | Artigalas et al. | |
| 6,091,884 A | 7/2000 | Yuen et al. | |
| 6,097,441 A | 8/2000 | Allport | |
| 6,098,065 A | 8/2000 | Skillen et al. | |
| 6,104,334 A | 8/2000 | Allport | |
| 6,104,705 A | 8/2000 | Ismail et al. | |
| 6,125,230 A | 9/2000 | Yaginuma | |
| 6,130,726 A | 10/2000 | Darbee et al. | |
| 6,133,909 A | 10/2000 | Schein et al. | |
| 6,139,177 A | 10/2000 | Venkatraman et al. | |
| 6,151,643 A | 11/2000 | Cheng et al. | |
| 6,157,411 A | 12/2000 | Williams et al. | |
| 6,163,316 A | 12/2000 | Killian | |
| 6,163,345 A | 12/2000 | Noguchi et al. | |
| 6,172,674 B1 | 1/2001 | Etheredge | |
| 6,177,931 B1 | 1/2001 | Alexander et al. | |
| 6,181,335 B1 | 1/2001 | Hendricks et al. | |
| 6,182,106 B1 | 1/2001 | Casey et al. | |
| 6,184,877 B1 * | 2/2001 | Dodson et al. | 725/110 |
| 6,208,384 B1 | 3/2001 | Schultheiss | |
| 6,212,553 B1 | 4/2001 | Lee et al. | |
| 6,216,264 B1 | 4/2001 | Maze et al. | |
| 6,233,734 B1 | 5/2001 | Macrae et al. | |
| 6,237,049 B1 | 5/2001 | Ludtke | |
| 6,240,555 B1 | 5/2001 | Shoff et al. | |
| 6,262,722 B1 | 7/2001 | Allison et al. | |
| 6,263,501 B1 | 7/2001 | Schein et al. | |
| 6,266,814 B1 | 7/2001 | Lemmons et al. | |
| 6,268,849 B1 | 7/2001 | Boyer et al. | |
| 6,310,886 B1 | 10/2001 | Barton | |
| 6,317,885 B1 | 11/2001 | Fries | |
| 6,327,049 B1 | 12/2001 | Ohtsuka | |
| 6,331,877 B1 | 12/2001 | Bennington et al. | |
| 6,335,963 B1 | 1/2002 | Bosco | |
| 6,341,374 B2 | 1/2002 | Schein et al. | |
| 6,357,043 B1 | 3/2002 | Ellis et al. | |
| 6,359,636 B1 | 3/2002 | Schindler et al. | |
| 6,373,528 B1 | 4/2002 | Bennington et al. | |
| 6,388,714 B1 | 5/2002 | Schein et al. | |
| 6,393,437 B1 * | 5/2002 | Zinda et al. | 717/124 |
| 6,396,546 B1 | 5/2002 | Alten et al. | |
| 6,408,437 B1 | 6/2002 | Hendricks et al. | |
| 6,411,696 B1 | 6/2002 | Iverson et al. | |
| 6,418,556 B1 | 7/2002 | Bennington et al. | |
| 6,437,836 B1 | 8/2002 | Huang et al. | |
| 6,463,585 B1 | 10/2002 | Hendricks et al. | |
| 6,505,348 B1 | 1/2003 | Knowles et al. | |
| 6,509,908 B1 | 1/2003 | Croy et al. | |
| 6,516,467 B1 | 2/2003 | Schindler et al. | |
| 6,526,577 B1 | 2/2003 | Knudson et al. | |
| 6,545,722 B1 | 4/2003 | Schultheiss et al. | |
| 6,546,399 B1 | 4/2003 | Reed et al. | |
| 6,564,378 B1 | 5/2003 | Satterfield et al. | |
| 6,611,654 B1 | 8/2003 | Shteyn | |
| 6,661,468 B2 | 12/2003 | Alten et al. | |
| 6,668,377 B1 | 12/2003 | Dunn | |
| 6,675,385 B1 | 1/2004 | Wang | |
| 6,675,386 B1 | 1/2004 | Hendricks et al. | |
| 6,732,369 B1 | 5/2004 | Schein et al. | |
| 6,742,183 B1 | 5/2004 | Reynolds et al. | |
| 6,754,904 B1 | 6/2004 | Cooper et al. | |
| 6,760,537 B2 | 7/2004 | Mankovitz | |
| 6,769,128 B1 | 7/2004 | Knee et al. | |
| 6,828,993 B1 | 12/2004 | Hendricks et al. | |
| 6,865,746 B1 | 3/2005 | Herrington et al. | |
| 6,898,762 B2 | 5/2005 | Ellis et al. | |
| 6,925,567 B1 | 8/2005 | Hirata et al. | |
| 6,983,483 B2 | 1/2006 | Maze et al. | |
| 7,013,478 B1 | 3/2006 | Hendricks et al. | |
| 7,047,241 B1 | 5/2006 | Erickson | |
| 7,050,988 B2 | 5/2006 | Atcheson et al. | |
| 7,058,635 B1 | 6/2006 | Shah-Nazaroff et al. | |
| 7,134,131 B1 | 11/2006 | Hendricks et al. | |
| 7,165,098 B1 | 1/2007 | Boyer et al. | |
| 7,185,355 B1 | 2/2007 | Ellis et al. | |
| 7,187,847 B2 | 3/2007 | Young et al. | |
| 7,328,450 B2 | 2/2008 | Macrae et al. | |
| 7,349,976 B1 | 3/2008 | Glaser et al. | |
| 7,363,645 B1 | 4/2008 | Hendricks | |
| 7,437,751 B2 | 10/2008 | Daniels | |
| 7,480,929 B2 | 1/2009 | Klosterman et al. | |
| 7,493,641 B2 | 2/2009 | Klosterman et al. | |
| 7,540,010 B2 | 5/2009 | Hanaya et al. | |
| 7,665,109 B2 | 2/2010 | Matthews, III et al. | |
| 7,721,307 B2 | 5/2010 | Hendricks et al. | |
| 7,757,254 B2 | 7/2010 | Shoff et al. | |
| 8,078,751 B2 | 12/2011 | Janik et al. | |
| 8,112,776 B2 | 2/2012 | Schein et al. | |
| 8,205,232 B2 | 6/2012 | Schein et al. | |
| 9,003,451 B2 | 4/2015 | Boyer et al. | |
| 2002/0026496 A1 | 2/2002 | Boyer et al. | |
| 2002/0032907 A1 | 3/2002 | Daniels | |
| 2002/0048448 A1 | 4/2002 | Daniels | |
| 2002/0059599 A1 | 5/2002 | Schein et al. | |
| 2002/0112249 A1 | 8/2002 | Hendricks et al. | |
| 2002/0138840 A1 | 9/2002 | Schein et al. | |
| 2003/0005445 A1 | 1/2003 | Schein et al. | |
| 2003/0031465 A1 | 2/2003 | Blake | |
| 2003/0115602 A1 | 6/2003 | Knee et al. | |
| 2003/0163813 A1 | 8/2003 | Klosterman et al. | |
| 2003/0164858 A1 | 9/2003 | Klosterman et al. | |
| 2003/0188310 A1 | 10/2003 | Klosterman et al. | |
| 2003/0188311 A1 | 10/2003 | Yuen et al. | |
| 2003/0196201 A1 | 10/2003 | Schein et al. | |
| 2003/0208756 A1 | 11/2003 | Macrae et al. | |
| 2003/0208758 A1 | 11/2003 | Schein et al. | |
| 2004/0078815 A1 | 4/2004 | Lemmons et al. | |
| 2004/0103439 A1 | 5/2004 | Macrae et al. | |
| 2004/0133655 A1 | 7/2004 | Yen et al. | |
| 2004/0139465 A1 | 7/2004 | Matthews et al. | |
| 2004/0221310 A1 | 11/2004 | Herrington et al. | |
| 2005/0015815 A1 | 1/2005 | Shoff et al. | |
| 2005/0138660 A1 | 6/2005 | Boyer et al. | |
| 2005/0160461 A1 | 7/2005 | Baumgartner et al. | |
| 2005/0204388 A1 | 9/2005 | Knudson et al. | |
| 2005/0229215 A1 | 10/2005 | Schein et al. | |
| 2005/0235320 A1 | 10/2005 | Maze et al. | |
| 2005/0267819 A1 | 12/2005 | Kaplan | |
| 2005/0278741 A1 | 12/2005 | Robarts et al. | |
| 2005/0283800 A1 | 12/2005 | Ellis et al. | |
| 2006/0037044 A1 | 2/2006 | Daniels | |
| 2006/0143655 A1 | 6/2006 | Ellis et al. | |
| 2007/0271582 A1 | 11/2007 | Ellis et al. | |
| 2008/0178221 A1 | 7/2008 | Schein et al. | |
| 2008/0184308 A1 | 7/2008 | Herrington et al. | |
| 2008/0184315 A1 | 7/2008 | Ellis et al. | |
| 2008/0184319 A1 | 7/2008 | Mankovitz | |

(56) References Cited

U.S. PATENT DOCUMENTS

| | | |
|---|---|---|
| 2008/0235725 A1 | 9/2008 | Hendricks |
| 2008/0288980 A1 | 11/2008 | Schein et al. |
| 2009/0031335 A1 | 1/2009 | Hendricks et al. |
| 2009/0070817 A1 | 3/2009 | Ellis et al. |
| 2009/0077589 A1 | 3/2009 | Boyer et al. |
| 2010/0115413 A1 | 5/2010 | Schein et al. |
| 2010/0115541 A1 | 5/2010 | Schein et al. |
| 2010/0211969 A1 | 8/2010 | Schein et al. |
| 2011/0173660 A1 | 7/2011 | Schein et al. |
| 2011/0258663 A1 | 10/2011 | Lemmons et al. |
| 2012/0079539 A1 | 3/2012 | Schein et al. |
| 2012/0272270 A1 | 10/2012 | Boyer et al. |
| 2013/0304586 A1 | 11/2013 | Angles et al. |

FOREIGN PATENT DOCUMENTS

| | | |
|---|---|---|
| CN | 1567986 | 1/2005 |
| DE | 31 51 492 | 7/1983 |
| DE | 3640436 A1 | 6/1988 |
| DE | 4201031 A1 | 7/1993 |
| DE | 4217246 A1 | 12/1993 |
| DE | 4240187 A1 | 6/1994 |
| DE | 4407701 A1 | 9/1995 |
| DE | 4440419 A1 | 5/1996 |
| DE | 19 531 121 A1 | 2/1997 |
| DE | 19 740 079 A1 | 3/1999 |
| EP | 0 276 425 A2 | 8/1988 |
| EP | 0339675 | 11/1989 |
| EP | 0 463 451 A2 | 1/1992 |
| EP | 0617563 A1 | 9/1994 |
| EP | 0 624 040 A2 | 11/1994 |
| EP | 0 644 689 A2 | 3/1995 |
| EP | 0 650 114 A2 | 4/1995 |
| EP | 0648054 A2 | 4/1995 |
| EP | 0 658 048 A1 | 6/1995 |
| EP | 0 669 761 A2 | 8/1995 |
| EP | 0 682 452 A2 | 11/1995 |
| EP | 0 705 036 | 4/1996 |
| EP | 0 723 369 A1 | 7/1996 |
| EP | 0721253 A2 | 7/1996 |
| EP | 0725539 A2 | 8/1996 |
| EP | 0 742 669 | 11/1996 |
| EP | 0 774 853 | 5/1997 |
| EP | 0774866 A2 | 5/1997 |
| EP | 0 793 225 | 9/1997 |
| EP | 0805594 A2 | 11/1997 |
| EP | 0 837 599 A2 | 4/1998 |
| EP | 0 852 361 A2 | 7/1998 |
| EP | 0 854 645 | 7/1998 |
| EP | 0 945 003 B1 | 9/1999 |
| GB | 1 554 411 | 10/1979 |
| GB | 2265792 | 10/1993 |
| GB | 2325537 A | 11/1998 |
| JP | 062060372 | 3/1987 |
| JP | 063-092177 A | 4/1988 |
| JP | 0254646 | 2/1990 |
| JP | 03022770 | 1/1991 |
| JP | 04079053 | 3/1992 |
| JP | 04227380 | 8/1992 |
| JP | 05260400 A | 10/1993 |
| JP | 05314186 B2 | 11/1993 |
| JP | 06021907 | 1/1994 |
| JP | 06038165 | 2/1994 |
| JP | 06-124309 | 5/1994 |
| JP | 06-132916 | 5/1994 |
| JP | 06504165 | 5/1994 |
| JP | 06197342 | 7/1994 |
| JP | 06217271 | 8/1994 |
| JP | 06243539 | 9/1994 |
| JP | 06350546 | 12/1994 |
| JP | 07-021619 | 1/1995 |
| JP | 0720254 | 1/1995 |
| JP | 07-135621 A | 5/1995 |
| JP | 07123326 | 5/1995 |
| JP | 07-162776 | 6/1995 |
| JP | 07147657 | 6/1995 |
| JP | 07154349 A | 6/1995 |
| JP | 07160732 | 6/1995 |
| JP | 07184131 A | 7/1995 |
| JP | 07193762 A | 7/1995 |
| JP | 07193763 A | 7/1995 |
| JP | 07212732 A | 8/1995 |
| JP | 07236099 | 9/1995 |
| JP | 08-32528 | 2/1996 |
| JP | 08-056352 | 2/1996 |
| JP | 08032538 | 2/1996 |
| JP | 08125497 | 5/1996 |
| JP | 08506941 | 7/1996 |
| JP | 08506942 | 7/1996 |
| JP | 08251122 | 9/1996 |
| JP | 08275077 | 10/1996 |
| JP | 09-009245 | 1/1997 |
| JP | 09-102827 A | 4/1997 |
| JP | 09-162821 | 6/1997 |
| JP | 10-042235 | 2/1998 |
| JP | 10-093933 | 4/1998 |
| JP | 10-512420 | 11/1998 |
| JP | 2006-238475 A | 9/2006 |
| JP | 2009-067054 A | 4/2009 |
| WO | WO-86/01359 A1 | 2/1986 |
| WO | WO-87/03766 | 6/1987 |
| WO | WO-89/03085 | 4/1989 |
| WO | WO-94/13107 | 6/1994 |
| WO | WO-94/14282 A1 | 6/1994 |
| WO | WO-94/14284 A1 | 6/1994 |
| WO | WO-95/01056 | 1/1995 |
| WO | WO-95/01058 A1 | 1/1995 |
| WO | WO-95/01059 A1 | 1/1995 |
| WO | WO-95/10910 | 4/1995 |
| WO | WO-95/15658 A1 | 6/1995 |
| WO | WO-9515657 A1 | 6/1995 |
| WO | WO-95/19092 A1 | 7/1995 |
| WO | WO-95/26095 A2 | 9/1995 |
| WO | WO-95/26608 A1 | 10/1995 |
| WO | WO-95/28055 A1 | 10/1995 |
| WO | WO-95/28799 A1 | 10/1995 |
| WO | WO-95/32585 | 11/1995 |
| WO | WO-95/32587 | 11/1995 |
| WO | WO-9532583 A1 | 11/1995 |
| WO | WO-95/33338 A1 | 12/1995 |
| WO | WO-96/07270 A1 | 3/1996 |
| WO | WO-96/09721 A1 | 3/1996 |
| WO | WO-96/13932 A1 | 5/1996 |
| WO | WO-9613013 A1 | 5/1996 |
| WO | WO-96/17467 A2 | 6/1996 |
| WO | WO-9617473 | 6/1996 |
| WO | WO-96/20555 | 7/1996 |
| WO | WO-9621990 A2 | 7/1996 |
| WO | WO-9627989 | 9/1996 |
| WO | WO-96/31980 A1 | 10/1996 |
| WO | WO-96/34486 A1 | 10/1996 |
| WO | WO-96/34491 A1 | 10/1996 |
| WO | WO-96/37983 A1 | 11/1996 |
| WO | WO-9637996 A1 | 11/1996 |
| WO | WO-96/41478 | 12/1996 |
| WO | WO-9638962 | 12/1996 |
| WO | WO-9641471 A1 | 12/1996 |
| WO | WO-97/13368 | 4/1997 |
| WO | WO-97/31480 | 8/1997 |
| WO | WO-97/36422 | 10/1997 |
| WO | WO-97/42763 | 11/1997 |
| WO | WO-97/47106 | 12/1997 |
| WO | WO-97/47143 | 12/1997 |
| WO | WO-97/48230 | 12/1997 |
| WO | WO-97/49237 | 12/1997 |
| WO | WO-97/49242 | 12/1997 |
| WO | WO-97/50251 | 12/1997 |
| WO | WO-9745786 | 12/1997 |
| WO | WO-98/10589 A1 | 3/1998 |
| WO | WO-98/16062 | 4/1998 |
| WO | WO-98/17063 A1 | 4/1998 |
| WO | WO-98/17064 A1 | 4/1998 |
| WO | WO-9821664 A1 | 5/1998 |

(56) References Cited

FOREIGN PATENT DOCUMENTS

| WO | WO-9821877 | 5/1998 |
|---|---|---|
| WO | WO-98/26584 | 6/1998 |
| WO | WO-98/43183 A1 | 10/1998 |
| WO | WO-98/48566 A2 | 10/1998 |
| WO | WO-98/56173 A1 | 12/1998 |
| WO | WO-98/56176 A1 | 12/1998 |
| WO | WO-99/01984 A1 | 1/1999 |
| WO | WO-99/04561 | 1/1999 |
| WO | WO-99/04570 | 1/1999 |
| WO | WO-99/14947 A1 | 3/1999 |
| WO | WO-99/30491 A1 | 6/1999 |
| WO | WO-99/45701 A1 | 9/1999 |
| WO | WO-99/60783 | 11/1999 |
| WO | WO-00/04708 A1 | 1/2000 |
| WO | WO-00/05889 A1 | 2/2000 |
| WO | WO-00/28734 A1 | 5/2000 |
| WO | WO-0079798 A1 | 12/2000 |
| WO | WO-2005/027512 A1 | 3/2005 |

OTHER PUBLICATIONS

A Wonderworld of Services, The Sunday Times, Innovation section, p. 4, Jan. 7, 1996.
ACM Multimedia 93 Proceedings, A Digital On-Demand Video Service Supporting Content-Based Queries, Little et al. pp. 427-436, Jul. 1993.
Aho, Debra, New Delphi Ads Push Envelope: Starting Visuals From Upstart Agency Go Too Far for One Paper's Tastes, Advertising Age 0.0, May 30, 1994, p. 16, Abstract.
Armstrong, L., Channel-Surfing's next wave: Henry Yuen's interactive Tv Guide takes on TCI and Viacom, BusinessWeek, Jul. 31, 1995.
Arnold, William F., Britain to get wired city—via telephone, Electronics, vol. 49, No. 5, Mar. 4, 1976, p. 76.
Articles from PR Newswire (Jun. 5, 1997), PR Newswire, Jun. 5, 1997, 19 pages.
Berniker, "TV Guide Going Online," Broadcasting & Cable, vol. 124, No. 24, Jun. 13, 1994.
Blahut et al., Interactive Television, Proceedings of the IEEE, vol. 83, No. 7, Jul. 1995, pp. 1071-1085.
Boyd-Merritt, R., Television wires two-way video, Electronic Engineering Times, Apr. 25, 1994.
Brugliera, Digital On-Screen Display—A New Technology for the Consumer Interface, Symposium Record Cable Sessions, 18th International Television Symposium and Technical Exhibition, Montreux, Switzerland, Jun. 10-15, 1993, pp. 572-586, Jun. 11, 1993.
Buchholz et al., Revolution auf dem Bildschirm—Die neuen Medien Videotext und Bildschirmtext, Wilhelm Goldmann Verlag, Munich, Germany, copyright 1979, pp. 24-33 and 36-39. (English language translation attached.).
Chen et al., Real Time Video and Audio in the World Wide Web, Proc. 4th World Wide Web Conference, 1995.
Cleland, Kim, Look Out MSN, Here Comes MCI, Advertising Age, vol. 66, No. 32, Aug. 14, 1995, p. 19.
Columbia House CD-ROM Direct: Detail Page, accessed from the internet at http://web.archive.org/web/19961221160255/http://www.columbiahouse.com/cd/cgis . . . , copyright 1996, printed on Sep. 19, 2013.
Columbia House CD-ROM Direct: Download Demos!, accessed from the internet at http://web.archive.org/web/19961221095819/http://www.columbiahouse.com/cd/cgis . . . , copyright 1996, printed on Sep. 19, 2013.
Columbia House CD-ROM Direct: Member Center, accessed from the internet at http://web.archive.org/web/19961221085905/http://www.columbiahouse.com/repl/cd/ . . . , copyright 1996, printed on Sep. 19, 2013.
Columbia House CD-ROM Direct: Member Center, copyright 1996.
Columbia House CD-ROM Direct: The Connection, accessed from the internet at http://web.archive.org/web/19961221100721/http://www.columbiahouse.com/repl/cd/ . . . , copyright 1996, printed on Sep. 20, 2013.
Columbia House CD-ROM Direct: The Connection, accessed from the internet at http://web.archive.org/web/19961223152924/http://www.columbiahouse.com/repl/cd/ . . . , copyright 1996, printed on Sep. 20, 2013.
Columbia House Laser Disc Club: FAQ Answers, accessed from the internet at http://web.archive.org/web/19961223165516/http://www.columbiahouse.com/repl/lc/t . . . , copyright 1996, printed on Sep. 20, 2013.
Columbia House Laser Disc Club: Join the Club, accessed from the internet at http://web.archive.org/web/19961221094037/http://www.columbiahouse.com/repl/lc/t . . . , copyright 1996, printed on Sep. 20, 2013.
Columbia House Music Club: Join The Club, accessed from the internet at http://web.archive.org/web/19961221091101/http://www.columbiahouse.com/repl/mc . . . , copyright 1996, printed on Sep. 20, 2013.
Columbia House Music Club: Search, accessed from the internet at http://web.archive.org/web/19961221114653/http://www.columbiahouse.com/repl/mc . . . , copyright 1996, printed on Sep. 19, 2013.
Columbia House Music Club: Shopping Cart, accessed from the internet at http://web.archive.org/web/19961221120941/http://www.columbiahouse.com/mc/cgis . . . , copyright 1996, printed on Sep. 19, 2013.
Columbia House Video Club: Essential Collection, accessed from the internet at http://web.archive.org/web/199612211131908/http://www.columbiahouse.com/vc/cgis/j . . . , copyright 1996, printed on Sep. 20, 2013.
Comdex—Mitsubishi Previews 40-Inch DiamondWeb TV, Newsbytes, Nov. 19, 1996, Abstract.
Compton et al., Internet CNN NEWSROOM: A digital video news magazine and library, Proceedings of the Intl. Conf. on Multimedia Computing and Systems, Washington, May 15-18, 1995; Los Alamitos, IEEE Comp. Soc. Press, U.S., May 15, 1995, pp. 296-301, XP010154611.
Cool Websites: [2 Star Edition], Houston Chronicle, Houston, Texas, Jul. 11, 1996, p. 3, Abstract.
DAVIC 1.0 Specifications, Part 1, Description of DAVIC Functionalities, Revision 3.2, Digital Audio-Visual Council, Jul. 10, 1995, 61 pages.
Day, R., The Great PC/TV Debate, OEM Magazine, Jul. 1, 1996.
December, Presenting Java, Sams.net Publishing, published Sep. 20, 1995.
Defence and Counterclaim of the First and Second Defendants, No. HC11 C 04556, between Starsight Telecast and United Video Properties (Claimants) and Virgin Media, Virgin Media Payments, and TiVo (Defendants), Mar. 14, 2012, pp. 10-11.
Dial M for Movie, Funkschau Nov. 1994, Perspektiven, Video on Demand, pp. 78-79. (English language translation attached.).
Dialing the printed page, ITT in Europe Profile, 11/Spring 1977.
DIRECTV Plus2 System, Thompson Consumer Electronics, Inc., 1999.
DiRosa, S., "Pinochle's BIGSURF Netguide," Jul. 1995, vol. 3.1 (Sections 18, 21, and 28-renumbered as pp. 1-27).
Does NBC Get It, Aug. 14, 1995, retrieved from the internet at http://www.open4success.org/db/bin19/019687.html, retrieved on Dec. 11, 2013.
Dr. Dobbs, Implementing a Web Shopping Cart, from the internet at https://www.drdobbs.com/article/print?articleId=184409959 &siteSect . . . , Sep. 1, 1996, printed from the internet on Sep. 13, 2012.
Draft Grounds of Invalidity for EP (UK) 0 880 856 (Trial B), No. HC11 C 04556, between Starsight Telecast and United Video Properties (Claimants) and Virgin Media, Virgin Media Payments, and TiVo (Defendants), Oct. 2013, 7 pgs.
Eckhoff, TV Listing Star on the Computer, Central Penn Business Journal, High Beam Research, Mar. 15, 1996.
Eitz, Gerhard, "Zukünftige Informations-Und Datenangebote Beim Digitalen Fernsehen-EPG Und "Lesezeichen"," Rundfunktechnische Mitteilungen, vol. 41, pp. 67-72, Jun. 1997. (English language translation attached.).

(56) References Cited

OTHER PUBLICATIONS

Electronic Program Guide via Internet, Research Disclosure 38502, Kenneth Mason Publications, Hampshire, GB, ISSN: 0374-4353, vol. 385, No. 2, p. 276, May 1996.
Fry et al., Delivering QoS Controlled Continuous Media on the World Wide Web, Proceedings of the 4th International IFIP Workshop on QoS, Paris, Mar. 6-8, 1996, 12 pgs.
GameSpot: Allied General—Download It Now!!!!, accessed from the internet at http://web.archive.org/web/19970206133452/http://www.gamespot.com/strategy/allie . . . , copyright 1997, printed on Sep. 19, 2013.
GameSpot: Allied General at a Glance, accessed from the internet at http://web.archive.org/web/19970205153530/http://www.gamespot.com/strategy/allie . . . , copyright 1996, printed on Sep. 19, 2013.
GameSpot's Downloads for Allied General, accessed from the internet at http://web.archive.org/web/19970205060703/http://www.gamespot.com/strategy/allie . . . , copyright 1997, printed on Sep. 19, 2013.
Garneau, Information Highway in Quebec, Editor & Publisher, vol. 127, No. 5, Jan. 29, 1994, 4 pages.
Gateway Destination: The PC for the Office and the Family Room, PC Magazine, First Looks section, pp. 39-41, Jun. 11, 1996.
Goff, Leslie, Subs Find Lots of Program Guides Online, Multichannel News, vol. 17, No. 19, May 6, 1996, p. 38, Abstract.
Google News Archives—printout, received at the EPO on Mar. 22, 2007.
Growing U.S. interest in the impact of viewdata, Computing Weekly, Jul. 20, 1978.
Harada, Mamoru et al., Internet de telebi housou ga hajimaru, (Television Broadcasting Starts with the Internet), Nikkei Electronics, Japan, Nikkei BP, No. 653, Jan. 15, 1996, pp. 67-75. (Concise explanation included in IDS letter.).
Hauptmann et al., News on Demand, News-on-Demand: An Application of Informedia® Technology D-Lib Magazine, Sep. 13, 1995, XP002675162, Retrieved from the Internet: URL:http://www.dlib.org/dlib/september95/nod/page3.html [retrieved on May 2, 2012].
Hobbes' Internet Timeline 10.2, by Robert H'obbes' Zakon, from the internet at http://www.zakon.org/robert/internet/timeline/, printed from the internet on Sep. 13, 2012.
Hobbes' Internet Timeline, RFC 2235, Mar. 22, 2007.
Holland, Gary L. NAPLPS standard defines graphics and text communications, EDN, Jan. 10, 1985, pp. 179-192.
Honey, is there anything good on the remote tonight?, advertisement from Multichannel News, Broadband Week Section, p. 168, Nov. 30, 1998.
How Evolve Works, from the Internet at http://www.evolveproducts.com/network.html, printed on Dec. 28, 1998.
Iizuka et al., The Overview of Internet TV Guide Japan—1 and 2, the 53rd National Conference Proceedings, Japan, Information Processing Society of Japan, Sep. 6, 1996 pp. 3-227-230.
Ikejiri, Minoru et al., Maruchimedia wo riido suru apurikeishon kaihatu, (Application Development for Leading Multimedia), Journal of NTT Technologies, Japan, The Telecommunications Association of Japan, vol. 7, No. 9, Sep. 1, 1995, pp. 48-55. (Concise explanation included in IDS letter.).
Instruction Manual *Using StarSight* 2, StarSight Telecast, Inc., 1994.
Internet User Forecast by Country, Computer Industry Almanac—Press Release, from the internet at http://www.c-i-a.com/internetusersexec.html, printed from the internet on Sep. 13, 2012.
Kai et al., Development of a Simulation System for Integrated Services Television, Report from Information Processing Society of Japan, Japan, Sep. 13, 1996, vol. 96, No. 90 pp. 13-20. (Partial English language translation attached.).
Karunanithi, et al., A Feature-Based Neural Network Movie Selection Approach, Proc. Intl. Workshop on Applications of Neural Networks to Telecommunications, Stockholm, Sweden, May 22-24, 1995, pp. 162-169.
Katkere et al., Interactive Video on WWW: Beyond VCR-like Interfaces, Computer Networks and ISDN Systems, vol. 28, Issue 11, 1996, pp. 1559-1572.
Keith Lynch's timeline of net related terms and concepts, Mar. 22, 2007.
Khoo et al., An Expert System Approach to Online Catalog Subject Searching, Information Processing & Management: An International Journal, vol. 30, No. 2, 1994, pp. 223-238.
Large, P., Throw away the books—Viewdata's coming, Guardian, Jan. 10, 1978.
Large, P., Viewdata, the invention that brings boundless advice and information to the home, also sets a test for the Post Office, Financial Guardian, Jun. 29, 1978.
Leftwich et al., *StarSight Interactive Television Program Guide, Phase III*, Functional/Interactional Architecture Specification Document, Orbit Interaction, Palo Alto, California, undated.
Leftwich et al., *StarSight Interactive Television Program Guide, Phase IV*, Functional/Interactional Architecture Specification Document, Orbit Interaction, Palo Alto, California, published before Apr. 19, 1995.
LISTS> What's on Tonite TV Listings INTERNET ARTICLE, [Online], Jan. 28, 1995, XP002378869 Retrieved from the Internet: URL: www.scout.wisc.edu/Projects/PastProjects/NH/95-01-31/0018.html> [retrieved on Apr. 28, 2006] *the whole document*.
Little et al., Prospects for Interactive Video-on-Demand, IEEE Multimedia, Fall 1994, pp. 14-24.
Lloyd, J., Impact of technology, Financial Times, Jul. 1978.
Loen et al., Subscriber Terminal Units for Video Dial Tone Systems, IEEE Network, Sep./Oct. 1995, pp. 48-57.
Melton, The Uniden Super 4800, OnSat magazine, Jun. 10-16, 1990, pp. 2-4.
Miller, Matthew D., A Scenario for the Deployment of Interactive Multimedia Cable Television Systems in the United States in the 1990s, IEEE, vol. 82, No. 4, Apr. 1994.
Money, S.A., Teletext and Viewdata, Butterworth & Co. Ltd., London, 1979.
Moriyasu et al., A Communication Architecture of Key Delivery Protocol for Information Market System, Study Report of Information Processing Society of Japan, vol. 96, No. 108, Nov. 15, 1996, pp. 83-88. (English language Abstract included.).
Mosley, J.D., NAPLPS chip sets, though scarce, satisfy limited US videotex demand, EDN, Mar. 21, 1985, at p. 57.
Neue, Digitale Strategien—Bericht Von Den 5. Dermastaedter Fernsehtagen, FKT Fernseh Und Kinotechnik, vol. 49, No. 3, Mar. 1, 1995, pp. 135-139, XP000507348, Fachverlag Schiele & Schon GmbH., Berlin, DE, ISSN: 1430-9947. (Concise explanation included in IDS letter.).
Neumann, Andreas, "WDR Online Aufbau Und Perspektiven Automatisierter Online-Dienste Im WDR," Rundfunktechnische Mitteilungen, vol. 41, pp. 56-66, Jun. 1997. (English language translation attached.).
Okimi, Katsuya et al., Shinban ISDN (New ISDN Edition), Japan, Ohmsha, Ltd., First Edition, Oct. 5, 1995, pp. 261-285. (Concise explanation included in IDS letter.).
Open TV für interaktives Fernsehen, Trend & Technik, 9-95 RFE, p. 100. (English language translation attached.).
Owen, K., How dial-a-fact is coming closer to home, The Times, Sep. 30, 1977.
Owen, K., Why the Post Office is so excited by its plans for a TV screen information service, The Times, Sep. 26, 1975.
Personal Entertainment Guide—User's Guide, Version 1.0, Copyright 1991 by Lookahead Communications Inc.
Poole, James, Demand for Viewdata Grows, Sunday Times, Oct. 2, 1977.
Prevue Channel Sep. 1, 1995 (part 1), PrevueGuide, from the internet at http://www.youtube.com/watch?v=OVul78nH6RY, retrieved on Nov. 26, 2013, 1 pg.
Prevue Online Debuts Local Listings for 250 Systems; System-Specific Listings Include Multimedia Features—Free Build Acceleration, PR Newswire, Jun. 5, 1997.
Prevue Online, Dec. 28, 1996, extract from web.archive.org, printed on Nov. 18, 2014, http://www.prevue.com.

(56) References Cited

OTHER PUBLICATIONS

Prodigy Launches Interactive TV Listing, Public Broadcasting Report, Apr. 22, 1994.
Qayyum, H., Using IVDS and VBI for Interactive Television, IEEE, Jun. 10, 1996.
Rajapakshe et al., Video on demand, (last modified Jun. 1995) <http://www-dse.doc.ic.ac.uk/~nd/suprise_95/Journal/vol4/shr/report.html>.
Rath et al., Set-Top Box Control Software: A Key Component in Digital Video, Philips Journal Of Research, vol. 50, No. 1/2, 1996, pp. 185-199.
Reaching your subscribers is a complex and costly process-until now, from the Internet at http://www.evolveproducts.com/info.html, printed on Dec. 28, 1998.
Rogers, C., Telcos vs. Cable TV: The Global View With Markets Converging and Regulatory Barriers Falling, Service Carriers Are Ready to Rumble, Data Communications, vol. 24, No. 13, pp. 75-78, and 80, Sep. 21, 1995.
Rosch, Gary D., New data and information system set for commercial market trial, Telephony, Mar. 20, 1978, pp. 98-100 and 102.
Ruffler et al., InfoRadio on Demand, WebTV and digiTaz—Telecommerce Case Studies, 3rd International Workshop on Community Networking, 1996, May 23-24, 1996, pp. 71-76.
Ryan, K., Free Interactive TV Guide, Google Newsgroup, Alleged Date Sep. 29, 1995.
Ryan, M., Interactive TV Takes a Corporate Twist, Electronic Engineering Times, Jul. 10, 1995.
Savage, Internet's 'What's on Tonite!' Tells You Just That and More, The News, InfoWatch, May 29, 1995.
Schauer, Tom: (No Subject), INTERNET ARTICLE, [Online] Sep. 28, 1995, XP002378870, Retrieved from the Internet: URL: www.vision2020.moscow.com/Archives/1995/9509/0058.htlm> [retrieved on Apr. 28, 2006] *the whole document*.
Schmuckler, Eric, "A marriage that's made in cyberspace (television networks pursue links with online information services)," May 16, 1994, MEDIAWEEK, vol. 4, No. 20, p. 22 (3).
Selected pages from the BBC Online—Schedules web page. This web page is located at http://www.bbc.co.uk/schedules/ (as printed from the Internet on Oct. 19, 1999 and being dated as early as May 24, 1997).
Sharpless et al., An advanced home terminal for interactive data communication, Conf. Rec. Int. Conf. Commun. ICC '77, IEEE, Jun. 12-15, 1977, at p. 19.6-47.
St. John, Sandringham, Dress rehearsal for the PRESTEL show, New Scientist, Jun. 1, 1978, pp. 586-588.
Statement in an Examination Report dated Aug. 2, 1999 for a counterpart foreign application filed in New Zealand in which the foreign Examiner alleges that he has used the Internet to access television listings for BBC World television as far back as mid 1996 . . . .
Step Up to the Superhighway, The Sunday Times, Innovation section, p. 6, Jan. 7, 1996.
Stickland, D.C., Its a common noun, The Economist, Jun. 5, 1978.
Stokes, A., The viewdata age: Power to the People, Computing Weekly, Jan. 1979.
Sun's Next Steps in Digital Set-Tops, article in Cablevision, p. 56, Nov. 16, 1998.
SuperGuide/Uniden 4800, A Quick Guide to Programming the Uniden 4800—Dealer Set-Up Manual, undated, 8 pages.
SuperGuide/Uniden 4800, A Users Guide to SuperGuide's™ Features, undated, 12 pages.
Teletext presents the alternative view, Financial Times, Oct. 24, 1977.
The clickTV television program guide website of TVData of Queensbury, New York. This website is located at www.clicktv.com (as printed from the Internet on Aug. 13, 1997).
The Columbia House Video Club: Download Software, accessed from the internet at http://web.archive.org/web/19961223163101/http://www.columbiahouse.com/repl/vc . . . , copyright 1996, printed on Sep. 19, 2013.

The Evolve EZ Guide. The Remote Control, from the Internet at http://www.evolveproducts.com/display2.html, printed on Dec. 28, 1998.
The InfoBeat television program guide website of InfoBeat, Inc. This website is located at www.infobeat.com (as printed from the Internet on Dec. 8, 1997).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
Three men on a Viewdata bike, The Economist, Mar. 25, 1978.
Today's Stop: What's On Tonite, Oct. 3, 1995, retrieved from the internet at http://internettourbus.com/arch/1995/TB100395.TXT, retrieved on Dec. 9, 2013.
TV Guide movie database, Internet web pages printed on Aug. 12, 1999, 9 pages.
TV Guide Online Set For Fall, Entertainment Marketing Letter, Aug. 1994.
Uniden®, UST-4800 Super, Integrated Receiver/Descrambler, Preliminary Reference Manual, Nov. 12, 1991, 80 pages.
Uniden®, UST-4800, Integrated Receiver/Descrambler, Installation Guide, copyright 1990, 60 pages.
Uniden®, UST-4800, Integrated Receiver/Descrambler, Operating Guide, copyright 1990, 24 pages.
UVSG Offers System-Specific Web Site Development for OPS, press release of United Video Satellite Group, Apr. 12, 1996.
UVSG Teams With Microsoft on Internet Information Server, press release of United Video Satellite Group, Feb. 22, 1996.
VideoGuide, Videoguide Users Manual, copyright 1995 VideoGuide, Inc., pp. 1-27.
Viewdata and its potential impact in the USA: Final Report/vol. One, The UK Experience, Link and Butler Cox & Partners Limited, Oct. 1978.
Viewdata moves in U.S. but GEC may lose out, Computing Weekly, Jan. 25, 1978.
Viewdata Service Terminal Specification, British Post Office, Issue 5, Aug. 1978.
Waldo, Jim, "JiniTM Architecture Overview," from the Internet at http://Java.sun.com/products/jini/whitepapers/architectureoverview.pdf/ printed on Jan. 25, 1999. The document bears a copyright date of 1998.
Web TV and Its Consumer Electronics Licensees debut First Internet Television Network and Set Top Box, XP 002113265 Retrieved from the Internet: <URL http://www.ohlfs.com/keith/self/webtv/home/HTML/home.license.html> dated Jul. 10, 1996.
Welcome to Columbia House Online, accessed from the internet at http://web.archive.org/web/19961221085121/http://www.columbiahouse.com/, copyright 1996, printed on Sep. 19, 2013.
Whale, Identification of Program Similarity in Large Populations, The Computer Journal, vol. 33, No. 2, 1990, pp. 140-146.
What is Jini?, from the Internet at http://java.sun.com/products/jini/whitepapers/whatsjini.pdf, printed on Jan. 25, 1999.
What's New @ Prevue Online—Real™Video, May 2, 1997, extract from web.archive.org, printed on Nov. 18, 2014, http://www.prevue.com/scripts/whatsnew.asp.
What's On Tonite!, Jan. 28, 1995, retrieved from the internet at http://www.library.georgetown.edu/newjour/publication/whats-tonite-tm, retrieved on Dec. 11, 2013.
Whitehorn, K., Viewdata and you, Observer, Jul. 30, 1978.
Why Jini Now?, from the internet at http://java.sun.com/products/jini/whitepapers/whyjininow.pdf, printed on Jan. 25, 1999. The document bears a copyright date of 1998.
Wikipedia article, CompuServe, received at the EPO on Mar. 22, 2007.
Wikipedia article, Geschichte des Internets, from the internet at http://de.wikipedia.org/wiki/Geschichte_des_Internets, page last modified on Apr. 28, 2012, printed from the internet on May 18, 2012. (Concise explanation included in IDS letter.).

(56) References Cited

OTHER PUBLICATIONS

Wikipedia article, Internet Explorer, from the internet at http://de.wikipedia.org/wiki/Internet_Explorer, page last modified on Sep. 9, 2012, printed from the internet on Sep. 13, 2012. (Concise explanation included in IDS letter.).

Wikipedia article, MSN TV, from the internet at http://en.wikipedia.org/wiki/MSN_TV, page last modified on May 15, 2012, printed from the internet on Sep. 13, 2012.

Wikipedia article, NCSA Mosaic, from the internet at http://de.wikipedia.org/wiki/NCSA_Mosaic, page last modified on Sep. 3, 2012, printed from the internet on Sep. 13, 2012. (Concise explanation included in IDS letter.).

Wikipedia article, TVGN, from the internet at http://en.wikipedia.org/wiki/TVGN, page last modified on Nov. 17, 2014, printed from the internet on Nov. 18, 2014.

Williams, David M., and Perry, Burt, Rich Online Services as the Archetype for Interactive TV, Cable '94, Proceedings from Twelve Technical Sessions, 43rd Annual Convention and Exposition of the National Cable Television Association, May 22-25, 1994, New Orleans, LA., Technical Paper Compiled by Katherine Rutkowski, National Cable, XP008161201, pp. 21-35.

Wittig, H. et al., Intelligent Media Agents in Interactive Television Systems, Proceedings of the International Conference on Multimedia Computing and Systems, Los Alamitos, CA, US, May 15, 1995-May 18 1995, pp. 182-189, XP00603484, see p. 183, left hand column, paragraph 2, and p. 184, right-hand column, paragraph 2 figure 4.

Wolfe, Alexander, Beyond the SIPC, Electronic Engineering Times, No. 910, Jul. 15, 1996, p. 41, Abstract.

Wolfe, Alexander, Microsoft Poses PC Specs., Electronic Engineering Times, Jul. 8, 1996, Abstract.

Yarrow, The Media Business; Pay-Per-View Television is Ready for Takeoff, The New York Times, Archives, Nov. 14, 1988, 3 pages.

Yearling's Free Personalised TV Guide, from the internet at http://www.yearling.com/, Dec. 30, 1996.

Yoshida, J., Interactive TV a Blur, Electronic Engineering Times, Jan. 30, 1995.

\* cited by examiner

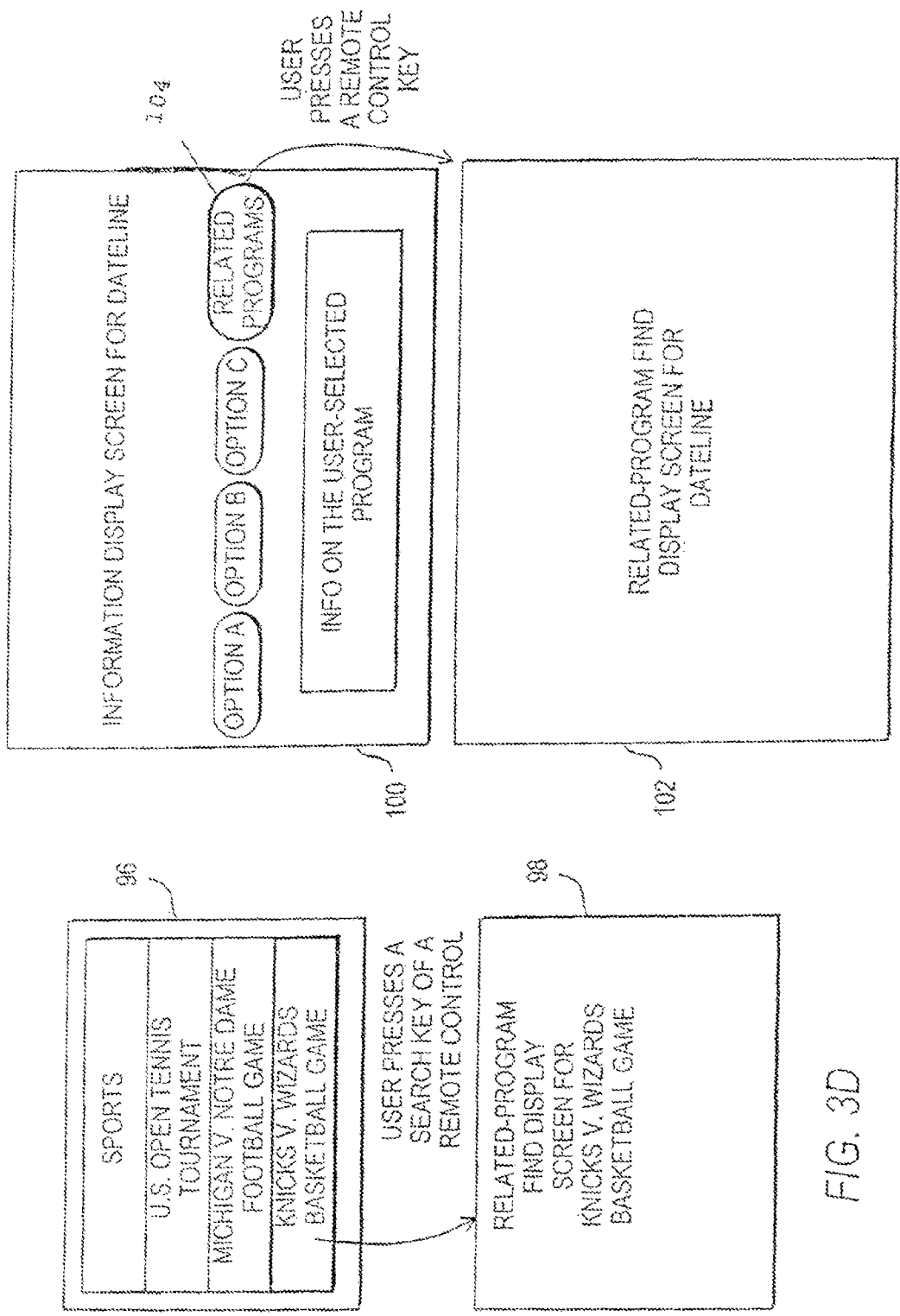

ELECTRONIC PROGRAM GUIDE WITH RELATED-PROGRAM SEARCH FEATURE

This application is a continuation of pending prior application Ser. No. 11/894,769, filed Aug. 20, 2007, which is a continuation of patent application Ser. No. 10/852,913, filed May 24, 2004, which is a continuation of patent application Ser. No. 09/451,612, filed Nov. 30, 1999, now U.S. Pat. No. 6,865,746, which claims the benefit of U.S. provisional application No. 60/110,989, filed Dec. 3, 1998. All of these prior patent applications are hereby incorporated by reference herein in their entireties.

BACKGROUND OF THE INVENTION

This invention relates to interactive television systems such as interactive television program guide systems, and more particularly, to techniques for program searching in these systems.

Cable, satellite, and broadcast television systems provide a large number of television channels. Typically, the number of channels provided by cable and satellite systems is over a hundred and ever increasing. Television viewers have traditionally consulted printed television program schedules to obtain programming information. More recently, interactive electronic television program guides have been developed to allow television program information to be displayed on viewer television equipment.

Interactive electronic television program guides ("program guides") typically provide program listings for all channels available in the television system. Some program guides include features for allowing users to search for programs. Such search features are often complex, time-consuming, and cumbersome. For example, such search features may require that a user select search parameters such as preferred programming genres before searching for programs, that a user navigate through several display screens before being allowed to initiate a search, that the user enter at least a portion of a program title to initiate a search, etc.

It is therefore an object of the present invention to provide a television system that includes an improved program searching feature.

SUMMARY OF THE INVENTION

These and other objects of the invention are accomplished in accordance with the principles of the present invention by providing a system for searching for programs. The system may provide the user with an opportunity to indicate an interest in a given program. The system may provide the user with an opportunity to request that the system locate programs that are related to the given program in which the user indicated an interest. The system may locate program listings that are related to the given program. The located program listings may be related to the given program based on attributes of the given program.

The system may display a list of the located program listings. The system may provide the user with an opportunity to select from the list of related programs. The system may tune to a program selected from the list, may display an information display screen for a program selected from the list, etc.

The system may provide the user with an opportunity to configure search parameters. For example, The system may present the user with a list of attributes for the given program and may allow the user to select one or more attributes and may allow the user to select which logical operations (e.g., and/or operations) are to be performed on the attributes. The system may search television program listings and may display a list of related programs based on the selected attributes.

The system may sort related program listings based on the attributes of the given program. The system may provide the user with an opportunity to save search parameters for use at a later time. The system may display a list of previously saved searches and may provide the user with an opportunity to direct the system to locate currently available program listings based on a saved search from the list. The system may locate currently available listings based on the user-selected search parameters from the saved search when the saved search is retrieved. The system may allow the user to delete a saved search. The system may automatically display a notification based on user-selected search parameters from a saved search. The system may provide the user with an opportunity to view the user-selected search parameters for a saved search.

Further features of the invention, its nature and various advantages will be more apparent from the accompanying drawings and the following detailed description of the preferred embodiments.

BRIEF DESCRIPTION OF THE DRAWINGS

FIG. 3d is a diagram of an illustrative sequence of illustrative display screens for providing an opportunity to request that the system locate programs that are related to a given program in accordance with the present invention.

FIG. 3e is a diagram of an illustrative sequence of illustrative display screens for providing an opportunity to request that the system locate programs that are related to a given program in accordance with the present invention.

DETAILED DESCRIPTION OF THE PREFERRED EMBODIMENTS

Figure 1:
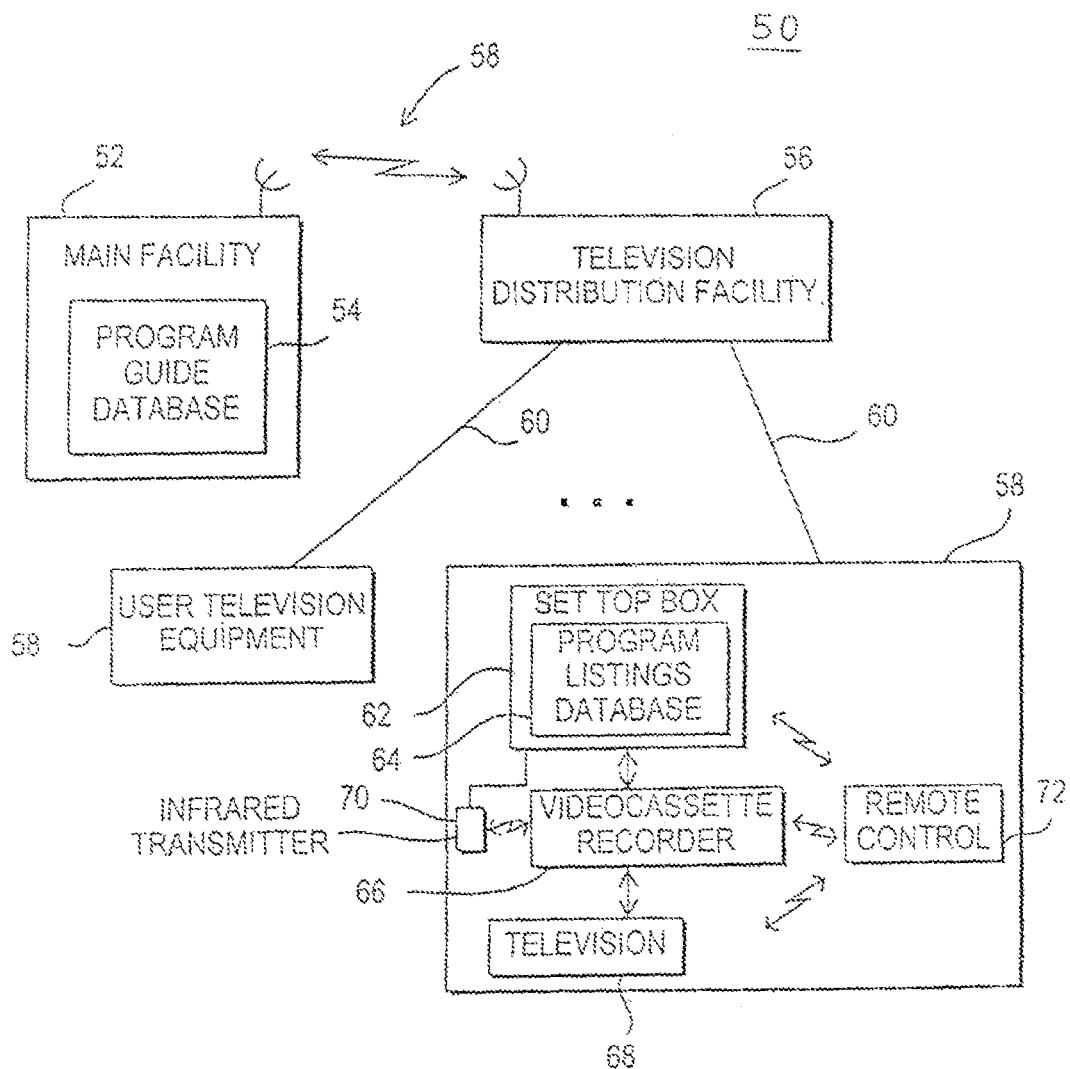
FIG. 1 is a diagram of an illustrative interactive television program guide system in accordance with the present invention.

An illustrative interactive television program guide system 50 in accordance with the present invention is shown in FIG. 1. Main facility 52 includes a program guide database 54 for storing program guide information (e.g., television program listings data, program-related information, service listings data, service-related information, pay-per-view ordering information, television program promotional information, etc.).

Main facility 52 preferably includes a processor to handle information distribution tasks. Information from database 54 may be transmitted in parallel via communications links such as communications link 58 to multiple television distribution facilities such as television distribution facility 56. Only one television distribution facility is shown in FIG. 1 to avoid over complicating the drawings. Each communications link 58 may be a satellite link, a telephone network link, a combination of such links, or another suitable communications path. Text, graphics, and video data signals may be transmitted over link 58. If it is desired to transmit video signals over communications link 58, a relatively high bandwidth link such as a satellite link is generally preferable to a relatively low bandwidth link, such as a telephone line.

Television distribution facility 56 is a facility such as a cable system headened, a broadcast distribution facility, or a satellite television distribution facility for distributing television signals to viewers.

The program guide information transmitted by main facility 52 to television distribution facility 56 includes television program listings data such as program times, channels, titles, descriptions, program type, genre, actors, etc. Transmitted program guide information may include pay program data such as pricing information for individual programs and subscription channels, time windows for ordering programs and channels, telephone numbers for placing orders that cannot be impulse ordered, etc.

Television distribution facility 56 may distribute program guide information received from main facility 52 to user television equipment 58 via communications paths 60. User television equipment 58 may be any suitable equipment for providing television that contains sufficient processing capabilities to monitor viewing activities, analyze these activities and display appropriate program listings information for the user.

Communications paths 60 may be cable links, fiber optic links, satellite links, broadcast links, or other suitable link, or a combination of such links. Any suitable communications scheme may be used to transmit data over paths 60, including in-band transmissions, out-of-band transmissions, digital transmissions, analog transmissions, cable transmissions, satellite transmissions, over-the-air transmissions, multichannel multipoint distribution services (MMDS) transmissions, etc.

Communications paths 60 preferably have sufficient bandwidth to allow television distribution facility 56 to distribute television programming, program listings information, advertisements, and other information to user television equipment 58. Multiple television and audio channels (analog, digital, or both analog and digital) may be provided to user television equipment 58 via communication paths 60. If desired, some of the data may be distributed to user television equipment 58 by one or more distribution facilities that are separate from television distribution facility 56 using communication paths that are at least partly separate from communication paths 60.

The data distribution technique that is used to distribute data on paths 60 may depend on the type of information that is being distributed. For example, text and graphics may be distributed over an out-of-band channel using an out-of-band modulator or distributed in the vertical blanking interval lines of an analog video channel. Video information may also be distributed in this way, although large quantities of video information may be more efficiently distributed using one or more digital channels or streams on paths 60. Such digital channels or streams may also be used for distributing text and graphics.

Each user television equipment device 58 has a receiver which is typically a set-top box such as set-top box 62. The receiver may also be other suitable television equipment such as an advanced television receiver into which circuitry similar co set-top-box circuitry has been integrated or a personal computer television (PC/TV). For illustrative purposes, the present invention will be described in the context of user television equipment 58 that uses set-top boxes.

Each set-top box 62 is typically connected to an optional videocassette recorder 66 so that selected television programs may be recorded. Videocassette recorder 66 is typically connected to a television 68. To record a program, set-top box 62 tunes to a particular channel and sends control signals to videocassette recorder 66 (e.g., using infrared transmitter 70) that instructs videocassette recorder 66 to start and stop recording at the appropriate times.

Television program listings, advertisements, programming information, and other information may be displayed on television 68. Each set-top box 62, videocassette recorder 66, and television 68 can be controlled by one or more remote controls 72 or any other suitable user input interface, such as a wireless keyboard, mouse, trackball, dedicated set of buttons, touch screen display remote, etc. Remote controls, such as remote control 72, have various buttons that can be pressed by the user such as arrow keys (e.g., for directing on-screen movement of a highlight region, for directing scrolling functions, etc.), an OK, select, enter, or other such selection key for making a selection (hereinafter referred to as an OK key), channel number keys (for selecting a television channel), a favorites key (to invoke functions related to user preferences), a delete key (to delete menu items or to express a disinterest in certain user preferences), an information key for receiving information on a program (hereinafter referred to as an INFO key), a specific feature key (e.g. a related-program search key to invoke program searching), etc. For illustrative purposes, many aspects of the present are discussed primarily in the context of a user interface being a remote control.

Certain program guide features, such as pay program purchasing, the purchasing of products or services, and data collection functions, may require that user television equipment 58 transmit data to television distribution facility 56 over communications paths 60. If desired, such data may be transmitted over telephone lines or other separate communications paths. If features such as these are provided using facilities separate from television distribution facility 56, some of the communications involving user television equipment 58 may be made directly with the separate facility (not shown).

If desired, an interactive television program guide system may be implemented using a data-relay architecture. In such an architecture, television distribution facility 56 may serve as a data relay site and user television equipment 58 may be a data destination site. For example, as television distribution facility 56 receives information from main facility 52, television distribution facility 56 may continuously or periodically distribute information to user television equipment 58. In a data-relay architecture, a program guide implemented on user television equipment 58 may use a database (e.g., database 64) for storing program guide information at user television equipment. Program guide information may include program listings and program attributes. Program at may be information such as program title, program actors, program duration, program genre (e.g., sports, comedy, movies, etc.), program channel, scheduled program duration, program rating (e.g., TV-G, PG-13, etc.), program content rating (or critics' rating or star rating, e.g., one star, two stars, etc.) and other related parameters that can be tagged to a program. Television distribution facility 56 may also poll set-top boxes periodically for certain information (e.g., pay program account information or information regarding programs that have been purchased and viewed using locally-generated authorization techniques).

The features of the present invention may be implemented in a client-server arrangement or in a combination client-server and data-relay arrangement in such arrangements, the server (e.g., television distribution facility 56) may include a database that may include program listing information.

For clarity, the present invention is sometimes described primarily in the context of program guides that are implemented on user television equipment rather than in the context of program guides that are implemented partially on a server and partially on user television equipment or a more fully server-based architecture.

Each set-top box 62 preferably contains a processor to handle tasks associated with implementing an application on the set-top box 62 that assists the user in searching for programs. For example, a stand-alone application may be provided that supports program searching, as described more fully below. If desired, these tasks may be implemented using a program guide application. For clarity, the present invention will be described primarily in the context of such a program guide application and in the context of a program guide system.

Figure 2:
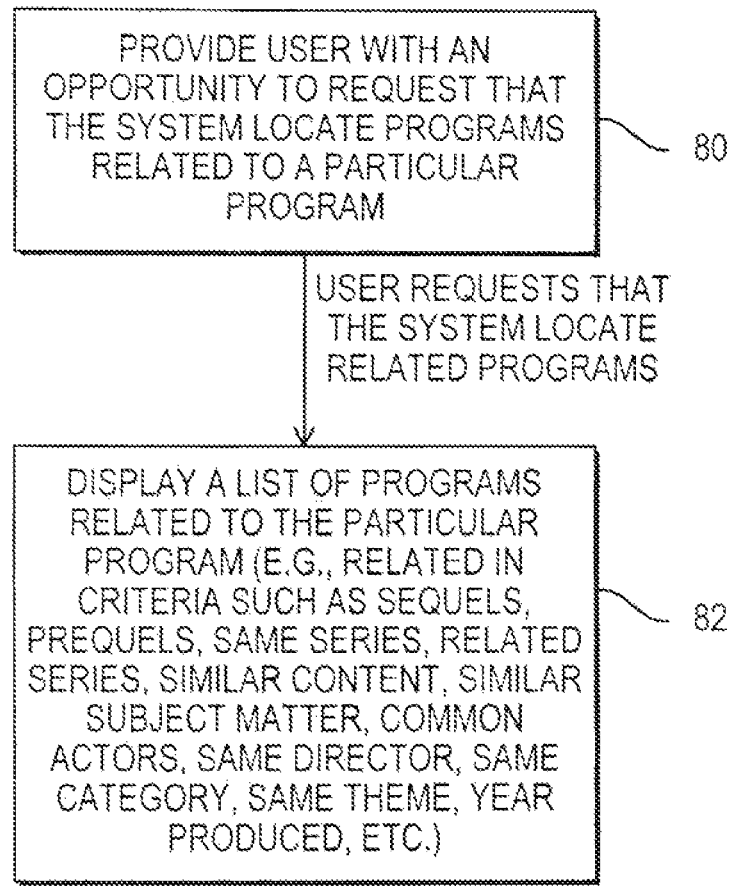
FIG. 2 is a flow chart of illustrative steps involved in providing program searching in accordance with the present invention.

Illustrative steps involved in providing program searching in an interactive television system such as interactive television program guide system 50 of FIG. 1 are shown in FIG. 2. Initially at step 80, the program guide may provide a user with an opportunity to request that the system locate programs that are related to a particular program (e.g., a program in which the user has indicated an interest using the system). The program guide may, at step 82, display a list of programs that are related to the particular program when the user requests that the system locate programs that are related to the particular program. The program guide may include programs in the list based on criteria, such as whether a program is related in attribute to the particular program, whether a program is a sequel or prequel of the particular program, whether a program is in the same program series as the particular program, whether a program is a series that is related to the particular program, whether a program is related the user-selected program in content or subject matter, whether a program has the same actor(s), director, category, theme, or production year as the user-selected program, etc.

Figure 3A:
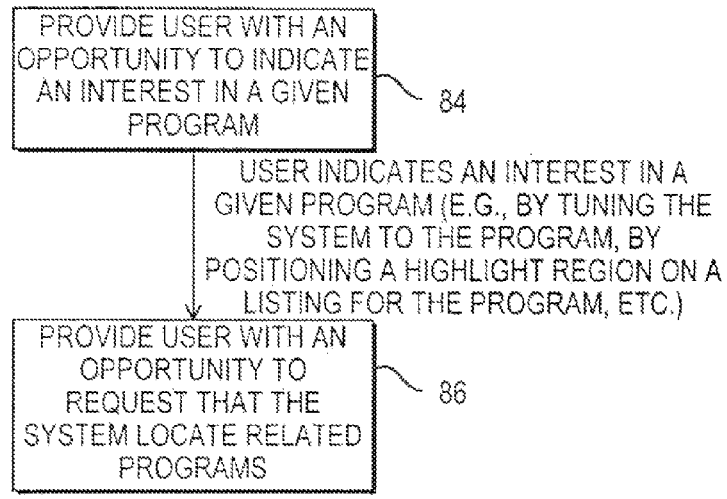
FIG. 3a is a flow chart of illustrative steps involved in providing an opportunity to request that the system locate programs related to a given program in accordance with the present invention.

Illustrative steps involved in providing a user with an opportunity to request that a system locate programs related to a given program in an interactive television system such as interactive television program guide system 50 of FIG. 1 are shown in FIG. 3*a*. At step 84, the program guide may provide a user with an opportunity to indicate an interest in a given program. The user may indicate an interest in the given program by, for example, positioning a highlight region on a program listing for the given program, tuning the system to the given program, selecting that an information display screen for the given program be displayed, etc. At step 86, the program guide may provide the user with an opportunity to request that the system locate programs that are related to the given program.

Figures 3B, 3C:
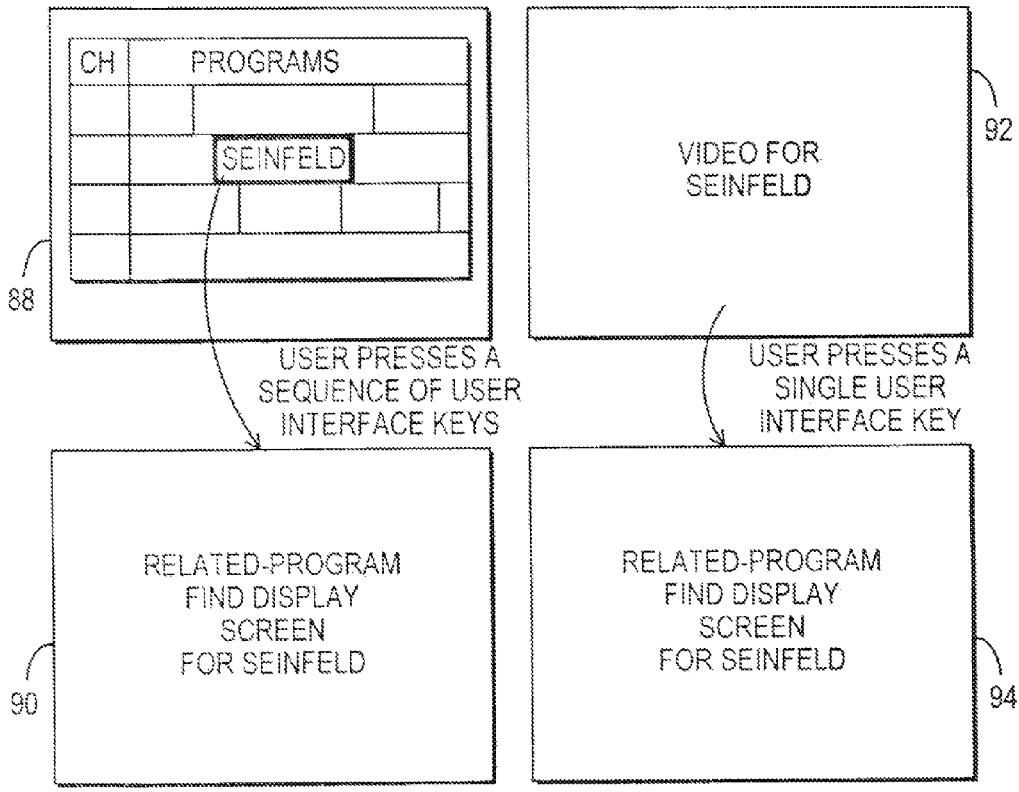
FIG. 3b is a diagram of an illustrative sequence of illustrative display screens for providing an opportunity to request that the system locate programs that are related to a given program in accordance with the present invention.
FIG. 3c is a diagram of an illustrative sequence of illustrative display screens for providing an opportunity to request that the system locate programs that are related to a given program in accordance with the present invention.

Illustrative display screens of FIG. 3*b*, FIG. 3*c*, FIG. 3*d*, and FIG. 3*e* may be provided based on the illustrative steps of FIG. 3*a*. As shown in FIG. 3*b*, the program guide may display related program find display screen 94 for the program Seinfeld when a user presses a single user interface key while a video for Seinfeld is displayed in display screen 92. The single user interface key may, for example, be a search key of a remote control for requesting that the system locate related programs.

If desired, as shown in FIG. 3*c*, the program guide may display related-program find display screen 90 for the program Seinfeld when the user presses a predetermined sequence of user interface keys after navigating a highlight region on a listing for Seinfeld in program listings display screen 88. The predetermined sequence of user interface keys may, for example, be pressing a search key and an OK key of a remote control.

A sequence of keys may be used when the user interface device (e.g., a remote control) does not have a key dedicated to providing the user with an opportunity to request that the system locate related programs.

If desired, as shown in FIG. 3d, the program guide may display related-program find display screen 98 for the Knicks v. Wizards basketball game when the user presses a search key of a remote control after navigating a highlight region on the listing for the Knicks v. Wizards basketball game in sports category program listings display screen 96.

If desired, as shown in FIG. 3e, the program guide may display related-program find display screen 102 for Dateline when a user presses a remote control OK key after navigating a highlight region on related programs option 104 of information display screen 100 for Dateline. The program guide may have displayed information display screen 100 for Dateline when, for example, the user pressed an OK key of a remote control after navigating a highlight region on a Dateline program listing, the user pressed an INFO key when video for Dateline is being displayed, etc. Examples of program guide systems with information display screen capabilities are provided in Rudnick et al., U.S. patent application Ser. No. 09/356,268 filed Jul. 16, 1999, which is hereby incorporated by reference herein in its entirety.

Figure 4:
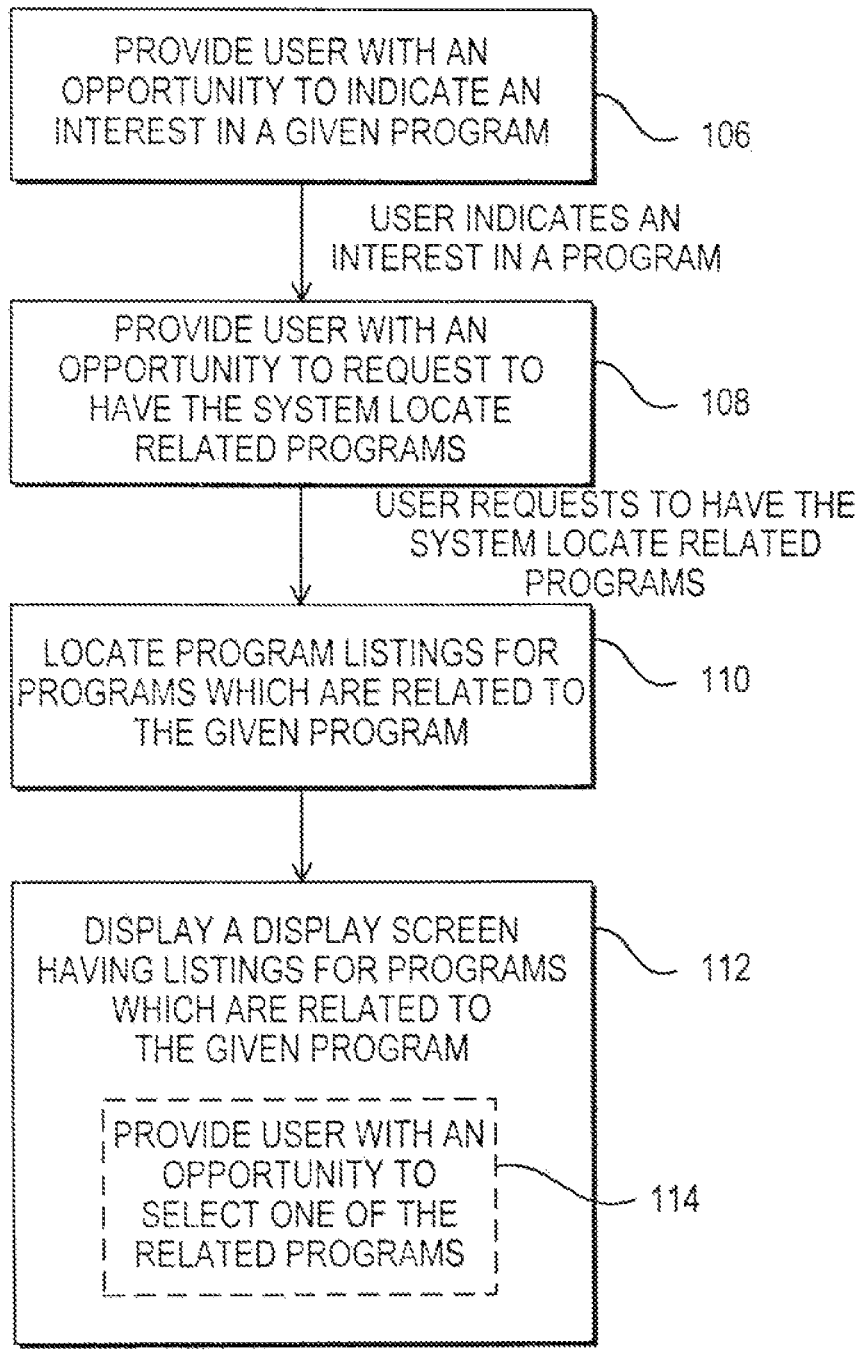
FIG. 4 is a flow chart of illustrative steps involved in displaying program listings that are related to a given program in accordance with the present invention.

Illustrative steps involved in displaying program listings that are related to a given program in an interactive television system such as interactive television program guide system 50 of FIG. 1 are shown in FIG. 4. At step 106, the program guide may provide the user with an opportunity to indicate an interest in a given program. At step 108, when the user indicates an interest in the given program, the program guide may provide the user with an opportunity to request that the system locate programs that are related to the given program.

At step 110, the program guide may locate program listings (e.g., program listings stored in a program guide database, such as database 64 of FIG. 1) that are related to the given program. The program guide may locate program listings based on attributes of the given program. For example, the program guide may locate program listings for programs that have an attribute that matches an attribute of the given program (e.g., a common actor, same content, same subject matter, same series, common director, same category, same theme, common production year, etc.), program listings for programs that have a plurality of attributes matching attributes of the given program, program listings for programs that have attributes that are related to the attributes of the given program (e.g., prequels, sequels, similar content, similar subject matter, related series, etc.), etc.

At step 112, the program guide may display a display screen (or, if desired, an overlay) having listings for programs which are related to the user-selected program. From the list, the user may find a particular program of interest to the user. The program guide may provide the user with an opportunity to select a program listing from the list at step 114.

Figure 5:
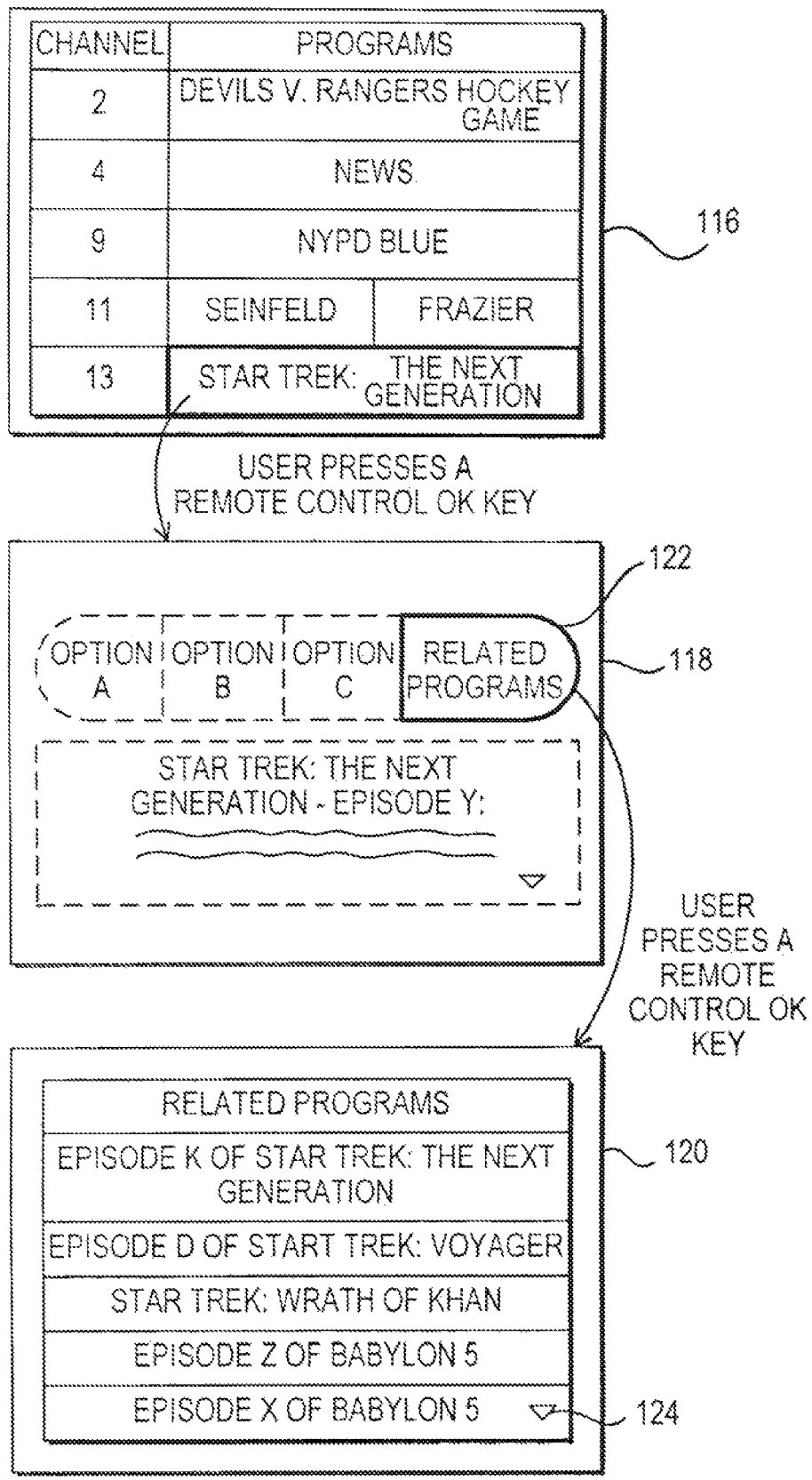
FIG. 5 is a diagram of an illustrative sequence of illustrative display screens for displaying program listings that are related to a given program in accordance with the present invention.

Illustrative program listings display screen 116, illustrative information display screen 118, and illustrative related-program find display screen 120 of FIG. 5 may be provided based on the illustrative steps of FIG. 4. The program guide may display information display screen 118 for Star Trek: The Next Generation—Episode Y when a user selects a listing for Star Trek: The Next Generation—Episode Y in program listings display screen 116 (e.g., by pressing an INFO key when a highlight region is positioned on that listing). Information display screen 118 may include a related programs options 122 for requesting to find programs related to Star Trek: The Next Generation—Episode Y.

The program guide may display related program find display screen 120 when a user selects the related programs option 122 from information display screen 118. Related-program find display screen 120 includes a list of programs related to Star Trek: The Next. Generation—Episode Y that contains: Episode K of Star Trek: The Next Generation, Episode D of Star Trek: Voyager, Star Trek: Wrath of Khan, Episode 21 of Babylon 5, Episode X of Babylon 5, etc. The list may have been sorted based on attributes that were used by the program guide to locate the displayed program listings. For example, the list may have been sorted based on which at caused the match, or for example, based on how many attributes matched. Related-program find display screen 120 may include an indicator, such as arrow 124, to inform the user that the list may be scrolled to display further listings for related programs that are not currently displayed. Such an indicator may be used when there is insufficient, space for displaying all the related programs in a related program find display screen.

Figure 6:
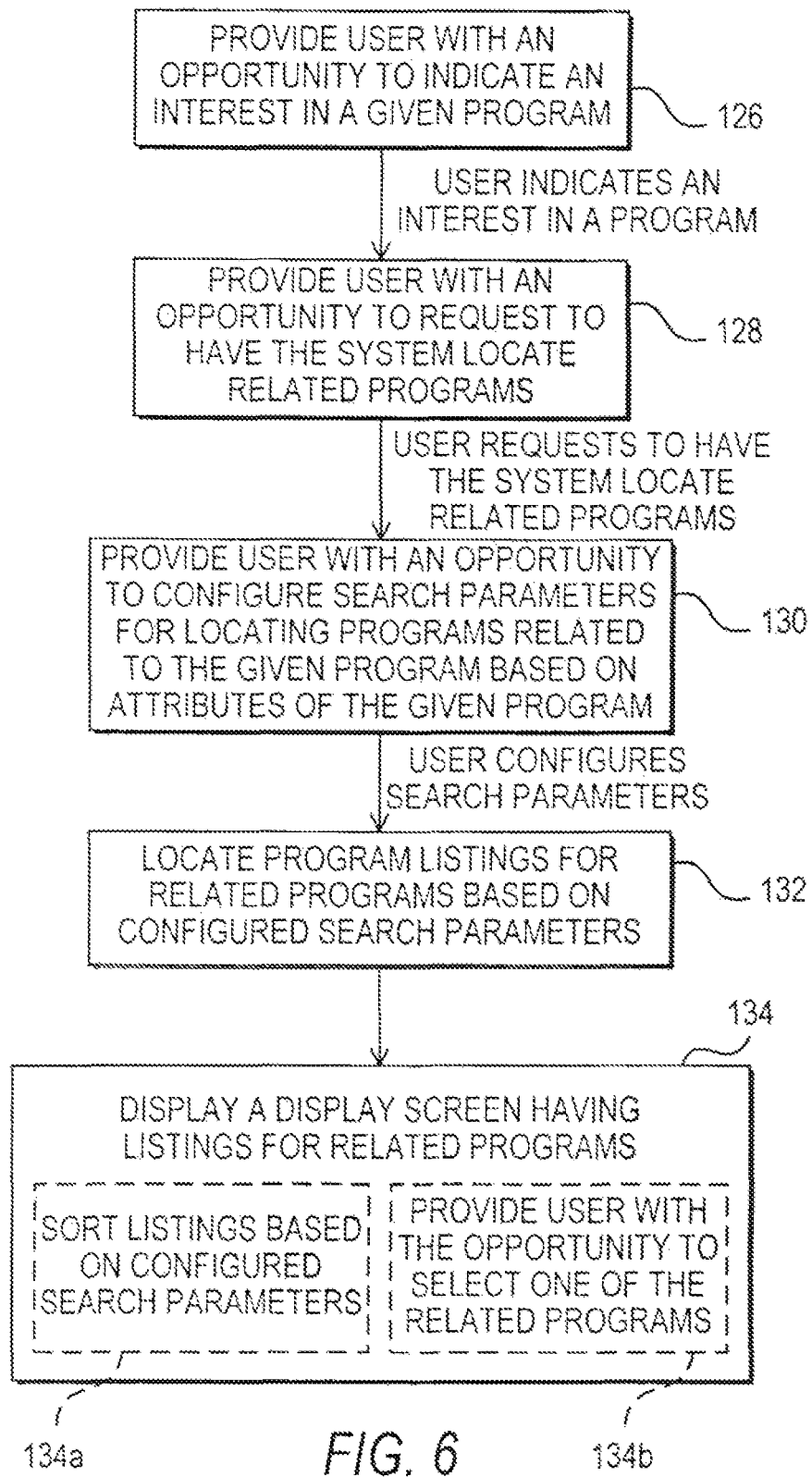
FIG. 6 is a flow chart of illustrative steps involved in displaying program listings that are related to a given program based on user-selected search parameters in accordance with the present invention.

Illustrative steps involved in displaying program listings that are related to a given program based on user-configured search parameters in an interactive television system such as interactive television program guide system 50 of FIG. 1 are shown in FIG. 6. Steps 126 and 128 are the same as steps 106 and 108 of FIG. 4, respectively, and are discussed above. At step 130 of FIG. 6, when the user requests that the system locate programs that are related to a given program, the program guide may provide the user with an opportunity to configure search parameters for searching for related programs based on attributes of the user-selected program. At step 132, the program guide may then locate program listings based on the user-configured search parameters. The program guide may locate program listings from program listings stored in a database, such as program listings database 64 FIG. 1. The location of the program listings database may depend on the communications arrangement of the interactive television program guide system (e.g., in a client-server arrangement at least part of the database may be located at a television distribution facility). At step 134, the program guide may display a display screen including on-screen listings for programs that are related to the given program based on the user-configured search parameters. At step 134a, the program guide may sort the located listings for display based on the user-configured search parameters. At step 134b, the program guide may provide the user with an opportunity to select one of the displayed programs listings.

Figure 7A:
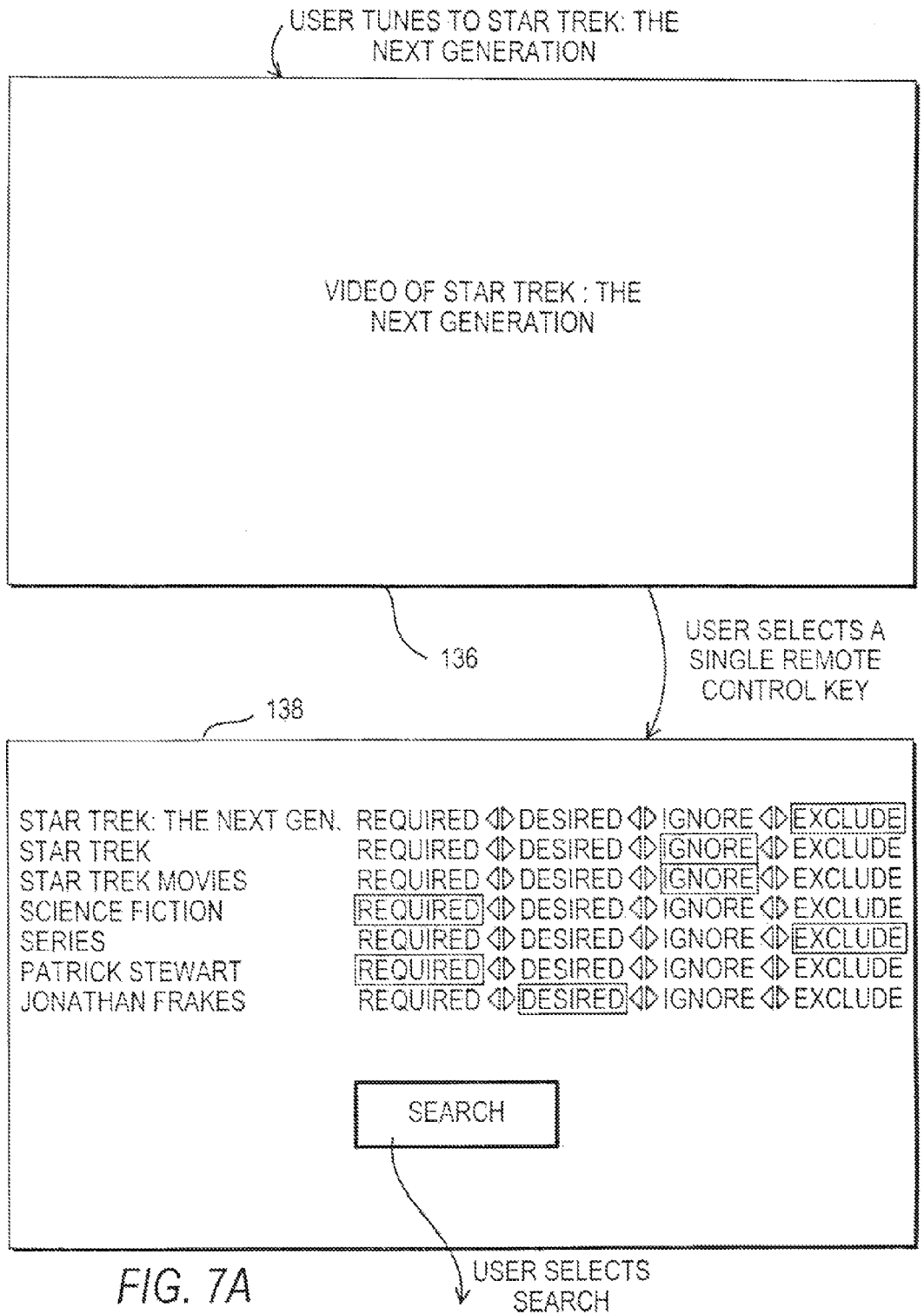
FIG. 7a is a diagram of an illustrative sequence of illustrative display screens for searching for program listing that are related to a given program based on user-selected search parameters in accordance with the present invention.

Illustrative display screen 136 and illustrative related-program find search configuration display screen 138 (hereinafter, configuration display screen 138) of FIG. 7a may be provided based on the illustrative steps of FIG. 6. The program guide may display configuration display screen 138 for an episode of Star Trek: The Next Generation when a user presses a single key of a remote control while a video for that episode of Star Trek: The Next Generation is being displayed. Configuration display screen 138 may contain an on-screen list of attributes for the given program, Star Trek: The Next Generation. The configuration display screen 138 may contain options for providing the user with an opportunity to assign various importance levels to the on-screen program attributes. The option may provide the user with an opportunity to assign different importance levels such as required, desired, ignored, or excluded to the program attributes.

Configuration display screen 138 shows that importance levels may be assigned to the program attributes for the given episode of Star Trek: The Next Generation so that when locating related program listings, the program guide excludes programs that are Star Trek: The Next Generation, ignores whether a program is a Star Trek program when deciding whether it matches, ignores whether a program is a Star Trek movie when deciding whether it matches, requires matching programs to be science fiction, requires matching programs to have Patrick Stewart. Configuration display screen 138 may include a search option that may provide the user with an opportunity to direct the program guide system to locate program listings related to the given program based on the program attributes and their assigned importance levels.

Figure 7B:
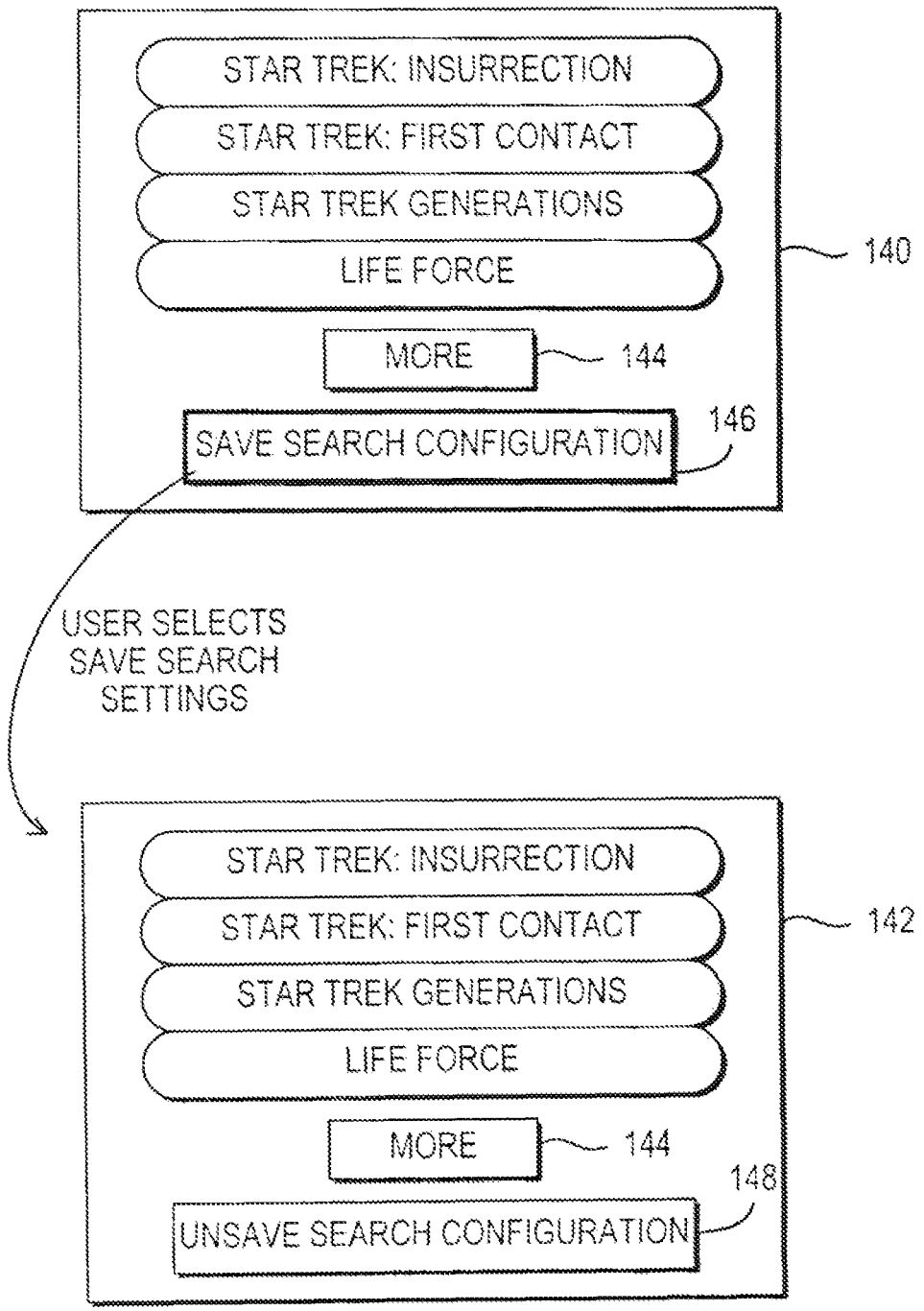
FIG. 7b is a diagram of an illustrative sequence of illustrative display screens for displaying program listings that are related to a given program based on user-selected search parameters in accordance with the present invention.

Illustrative related-program find display screens 140 and 142 of FIG. 7*b* may be provided based on the illustrative steps of FIG. 6. The program guide may display related-program find display screen 140 when, for example, the user selects the search option from configuration display screen 138 of FIG. 7*a*. Display screen 140 may include a list of programs that are related to the given program based on the search parameters of configuration display screen 138 of FIG. 7*a*. The list of related programs in display screen 140 includes the program Lifeforce, which is a science fiction program (a required attribute) starring Patrick Stewart (a required attribute), and includes three Star Trek movies (Insurrection, First Contact, and Generations) that are also science fiction programs starring Patrick Stewart and also starring Jonathan Frakes (a desired attribute). Lifeforce may be displayed at the bottom of the list because the other programs more closely match the user-configured search parameters.

Display screen 140 may include option 144 for displaying more program listings that are related to Star-Trek: The Next Generation based on the user-configured search parameters. Display screen 140 may include save configuration option 146 that provides the user with an opportunity to save the user-configured search parameters. The program guide may display related-program find display screen 142 when the user selects save configuration option 146 of display screen 140. Display screen 142 is the same display screen as display screen 140 except that display screen 142 includes unsave configuration option 148 that provides the user with an opportunity to unsave the user-configured search parameters (e.g., delete the saved user-configured search parameters).

Figure 7C:
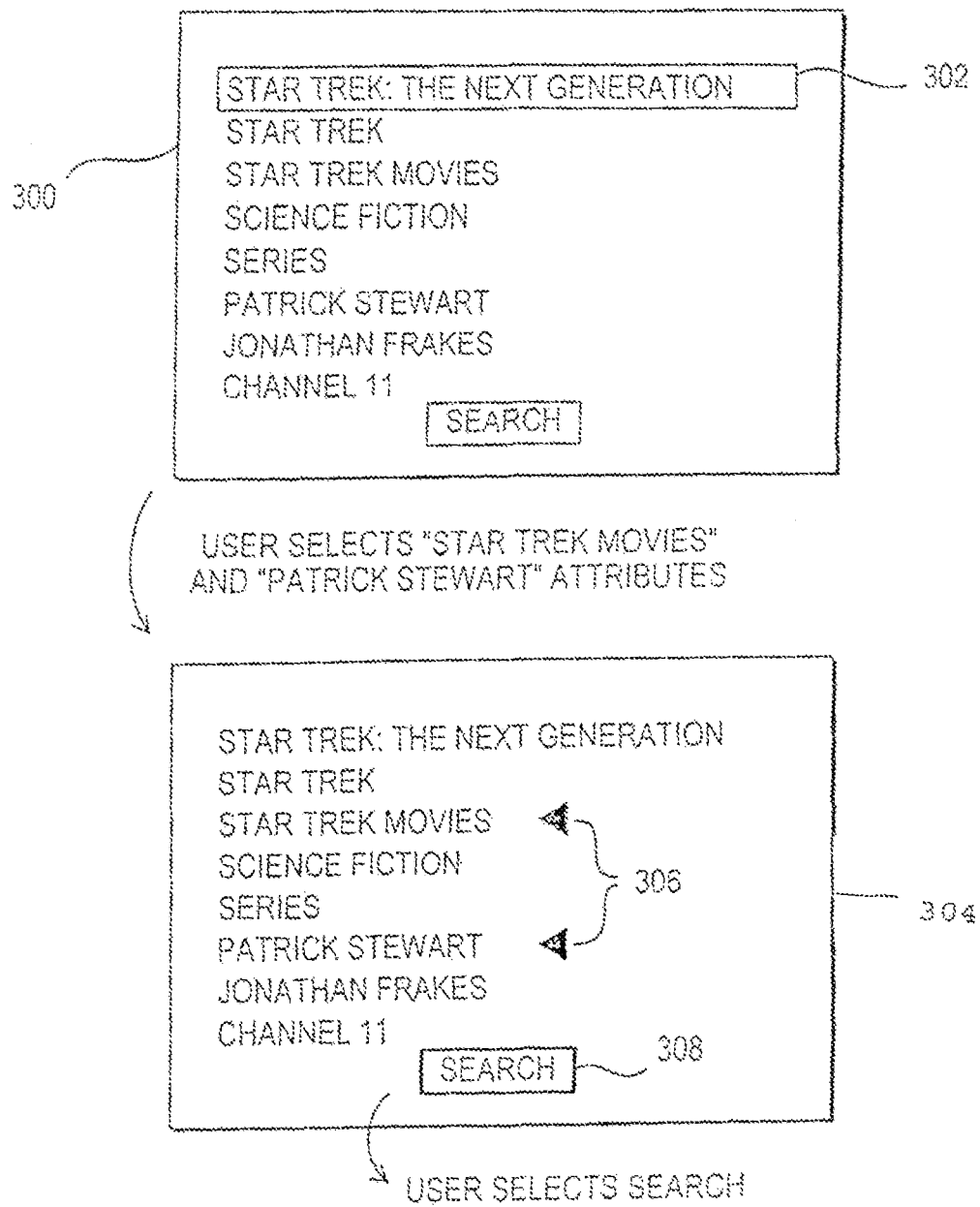
FIG. 7c is a diagram of an illustrative sequence of illustrative display screens for searching for program listings that are related to a given program based on user-selected search parameters in accordance with the present invention.

If desired, an arrangement such as that shown in FIG. 7*c* may be used to search for related programs. Initially, the user may indicate an interest in a given program by selecting a program listing for the given program from an on-screen display of program listings, by pressing an OK button or other remote control button while tuned to the given program (e.g., while tuned to the given program with a set-top box or the like), by selecting the program from the results of a search, etc.

A list of attributes for the given program (such as the attribute list of display screen 300 of FIG. 7*c*) may be displayed for the user (e.g., by the program guide or other interactive application running on the system). A moveable highlight region such as highlight region 302 or other such indicator may be used to provide the user with an opportunity to select attributes of interest to be used in searching for related programs.

As shown in display screen 304 of FIG. 7*c*, the user may select one or more attributes (e.g., by pressing a remote control OK button or otherwise selecting desired attributes). The system may display a visual indication of which program attributes have been scheduled. For example, the system may highlight selected attributes, may change their color, text font, brightness, etc. or may display an indicator such as indicators 306 to indicate which program attributes have been selected by the user. When the user highlights search option 308 and presses a remote control OK button (or otherwise selects option 308), the system searches for program listings matching the selected program attributes. When plural attributes are selected, the search may be performed using a logical AND or a logical OR function. The search results may be displayed using any suitable on-screen arrangement and may be selectable (for more information, automatic tuning, etc.) if desired.

The arrangement of FIG. 7*c* is merely illustrative. Any suitable arrangement may be used for providing an on-screen display of program attributes related to a selected program. The attributes may include program genre(s), actors, rating, channel, director, year produced, or any other suitable program attributes. The program attribute information may be provided with the program listings data. In a client-server arrangement, for example, the program attributes may be maintained with program listings data stored on a server located at a cable system headened (or at another suitable location). In configurations in which program listings are stored locally on a set-top box or other user equipment, program attributes may be maintained locally.

Figure 8A:
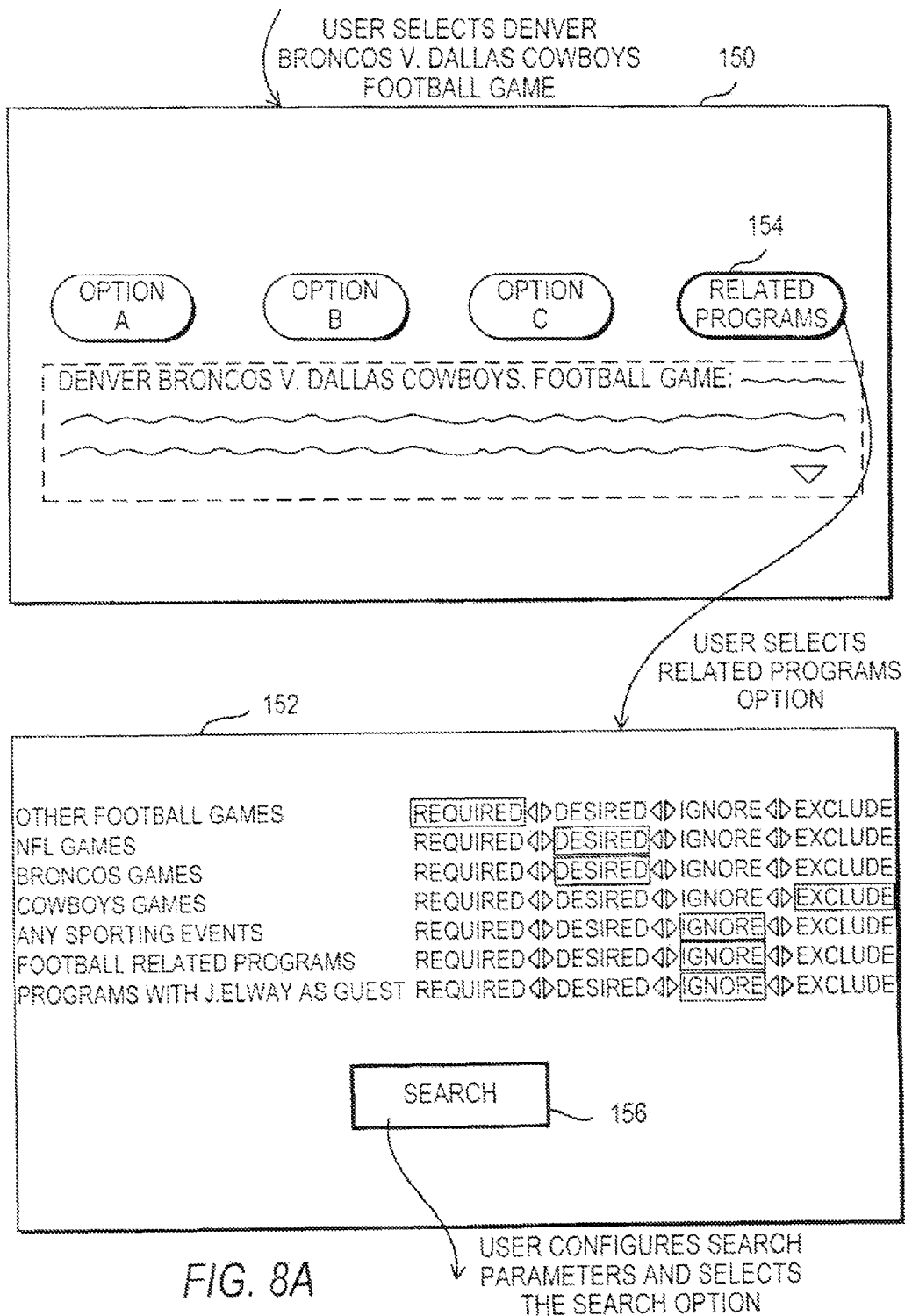
FIG. 8a an is a diagram of an illustrative sequence of illustrative display screens for searching for program listings that are related to a given program based on user-selected search parameters in accordance with the present invention.

Illustrative information display screen 150 and illustrative related-program find search configuration display screen 152 (hereinafter, configuration display screen 152) of FIG. 8*a* may be provided based on the illustrative steps of FIG. 6. The program guide may display information display screen. 150 when a user selects to receive information on the Denver Broncos v. Dallas Cowboys football game. Information display screen 150 may include related programs option 154 that provides the user with an opportunity to request that the system locate programs that are related to the Denver Broncos v. Dallas Cowboys football game. The program guide may display configuration display screen 152 when the user selects the related programs options from information display screen 150. Configuration display screen 152 may include an on-screen list of program attributes that are to be configured by the user.

The on-screen program attributes may differ based on the specifics of the given program and based on the category for the given program. For example, for a sports category program, the on-screen list may include attributes that are specific to that sports program and/or include attributes that are related to sports programs in general. As shown, configuration display screen 152 may include the following attributes: other football games, NFL games, Broncos games, Cowboys games, any sporting events, football-related programs, programs with John Elway as guest, etc. The user may then configure the search parameters to require matching programs to be football games, desire NFL games and Broncos games, exclude Cowboys games, ignore whether a program is a sporting event when deciding whether it matches, ignore whether a program is a football related program when deciding whether it matches, and ignore whether a program has John Elway as guest when deciding whether it matches.

Figure 8B:
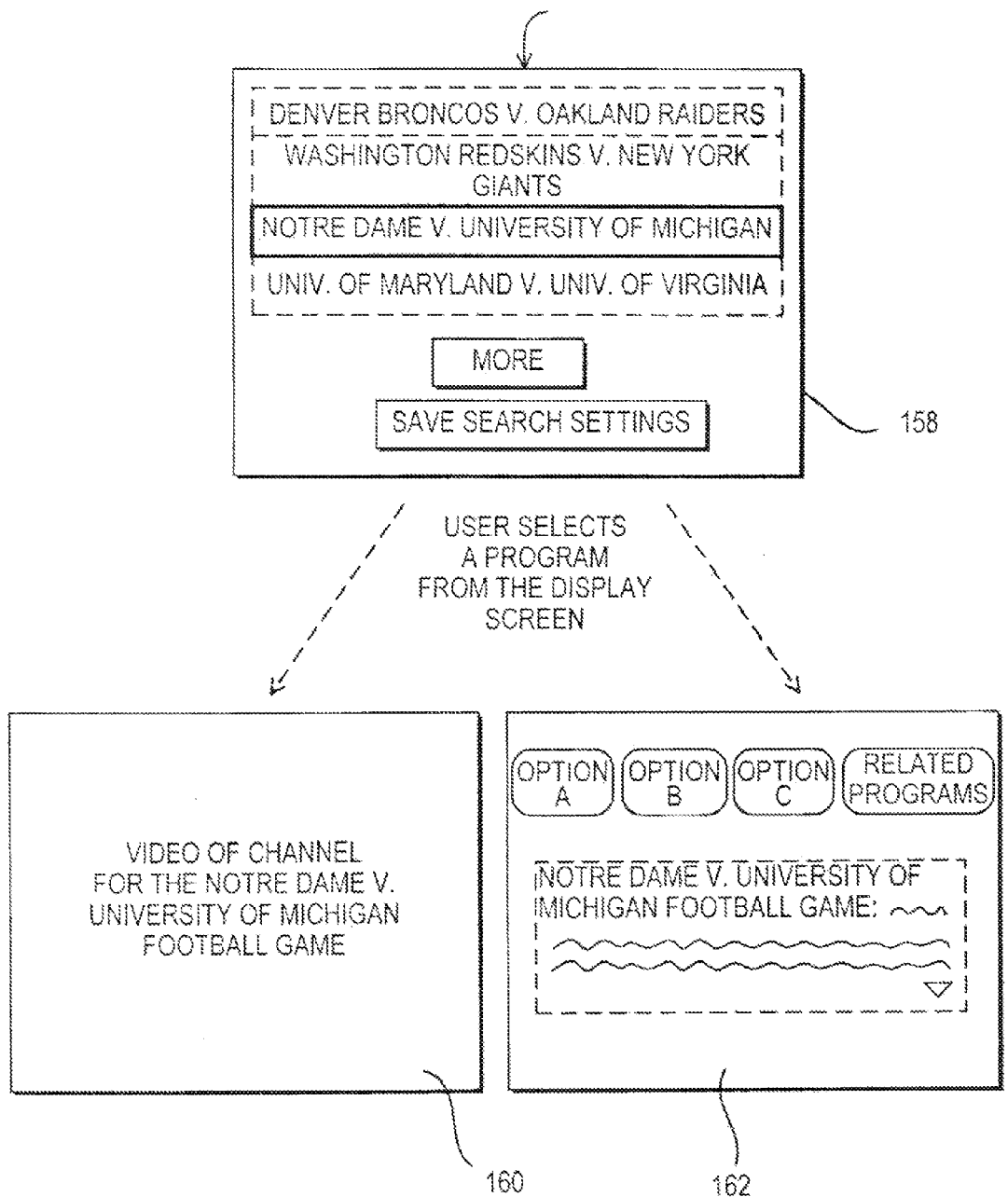
FIG. 8b is a diagram of an illustrative sequence of illustrative display screens for selecting a program listing that is related to a user-selected program in accordance with the present invention.

Illustrative related program find display screen 158 of FIG. 8*b* may be provided based on the illustrative steps of FIG. 6. Display screen 158 may be displayed when a user selects search option 156 from configuration display screen 152 of FIG. 8*a*. Display screen 158 of FIG. 8*b* may include listings that are sorted for display based on the user-configured search parameters of configuration display screen 152. The program guide may display program display screen 160 that contains video of a current program when the user selects a listing for a current program from the program listings contained in related-program find display screen 158. If desired, the program guide may display information display screen 162 for a program when the user selects a program listing from the program listings contained in related-program find display screen 158.

If desired, the listings in related-program find display screen 158 may include program title, air time, channel, rating, pay-per-view information, etc.

Figure 9:
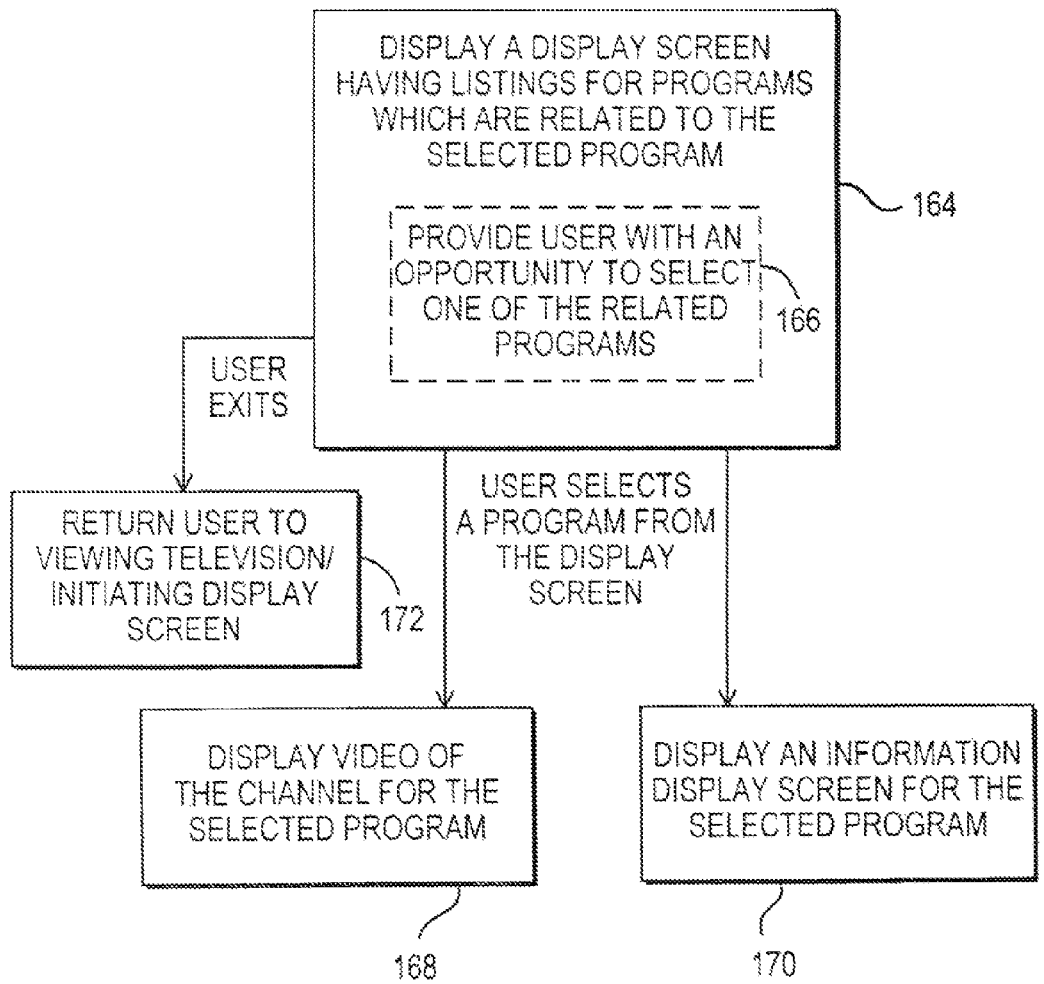
FIG. 9 is a flow chart of illustrative steps involved in providing display screens when a user makes selections from a related-program find display screen in accordance with the present invention.

Illustrative steps for an interactive television system such as interactive television program guide system 50 of FIG. 1 involved in providing the illustrative display screens of FIG. 8b are shown in FIG. 9. At step 164, the program guide may display a display screen having on-screen program listings that are related to a given program. Step 164 may include step 166 in which the program may provide the user with an opportunity to select one of the on-screen program listings. At step 168, the program guide may tune to a channel for a current program when the user selects one of the on-screen listings that is for a current program. At step 170, the program guide may display an information display screen for a selected on-screen listing when the user selects that on-screen listing. At step 172, the program guide may return the user to viewing television or to an earlier display screen when the user exits from the display screen having the related on-screen program listings (e.g., presses an exit or back key of a remote control).

Figures 10A, 10B:
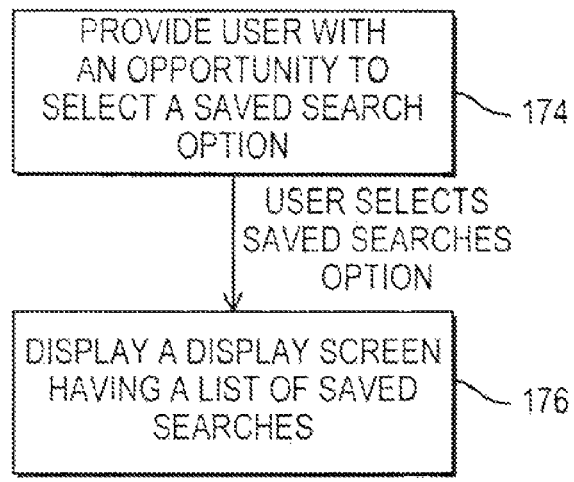
FIG. 10a is a flow of illustrative steps involved in displaying a display screen having a list of saved searches in accordance with the present invention.
FIG. 10b is a diagram of an illustrative sequence of illustrative display screens for providing a display screen having a list of saved searches in accordance with the present invention.

Illustrative steps for an interactive television system such as interactive television program guide system 50 of FIG. 1 involved in displaying a list of saved searches are shown in FIG. 10a. At step 174, the program guide may provide the user with an opportunity to select a saved search option. At step 176, the program guide may display a display screen having a list of saved searches when a user selects the saved search option.

Illustrative main menu display screen 178 and illustrative saved searches display screen 180 of FIG. 10b may be provided based on the illustrative steps of FIG. 10a. The program guide may display main menu display screen 178 to provide a main selection menu for accessing program guide features. Main menu display screen 178 may include saved searches option 182. The program guide may display saved searches display screen 180 when the user selects saved searches option 182. Saved searches display screen 180 may include a list of saved-searches that are identified on the screen using the given program title for each saved search. When two saved searches are for two programs with the same title, the program guide may use numbering to distinguish the listings. If desired, the user may have been allowed to name the saved searches. For example, the program guide may have provided the user with an opportunity to enter a name (e.g., by selecting or entering alphanumeric letters with a user interface device) for a search that a user is directing the program guide to save. The saved searches may be selected by the user to provide the user with an opportunity to search current program listings using search parameters that were user-configured in an earlier search of program listings.

Figure 11:
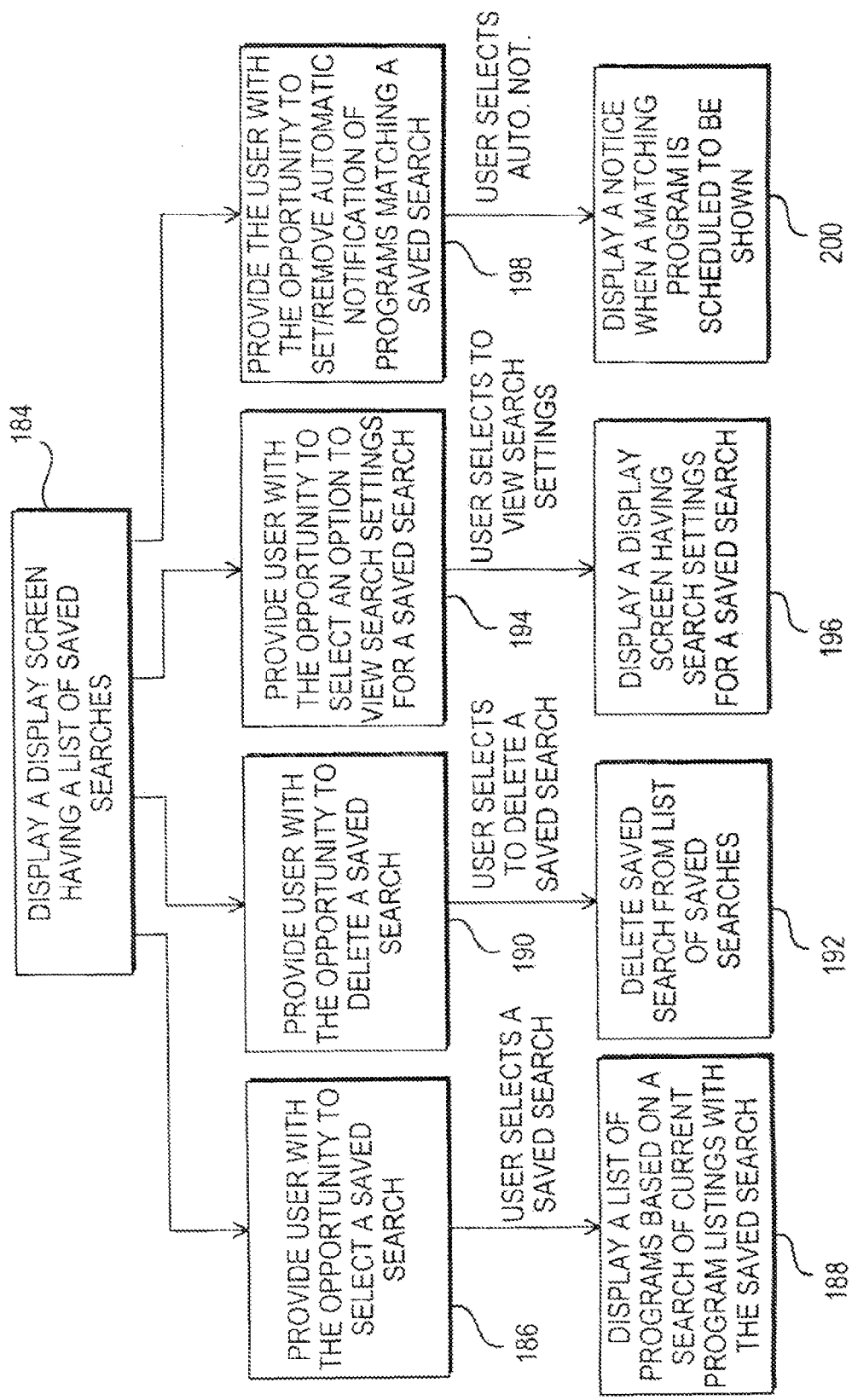
FIG. 11 is flow chart of illustrative involved in providing saved search features in accordance with the present invention.

Illustrative steps for an interactive television system such as interactive television program guide system 50 of FIG. 1 involved in displaying a list of saved searches are shown in FIG. 11. At step 184, the program guide may display a display screen having a list of saved searches. At step 186, the program guide may provide a user with an opportunity to select a saved search. At step 188, the program guide may display a list of programs based on a search of currently available program listings with saved search parameters from an earlier search.

At step 190, the program guide may provide the user with an opportunity to delete a saved search from the list of saved searches. At step 192, the program guide may delete a particular saved search when the user selects to delete that particular saved search.

At step 194, the program guide may provide the user with an opportunity to select an option to view user-configured search parameters for a saved search. At step 196, the program guide may display a display screen having user-configured search parameters for a saved search when the user selects to view user-configured search parameters for that saved search. If desired, step 196 may include a step that provides the user with the opportunity to modify the save searches.

At step 198, the program guide may provide the user with an opportunity to set (or remove) an automatic notification for programs that have been located using a saved search. At step 200, the program guide may display a notice that a located program is scheduled to air when the user has selected to receive automatic notifications. If desired, step 200 may include a step that provides the user with the opportunity to act on it.

Figure 12:
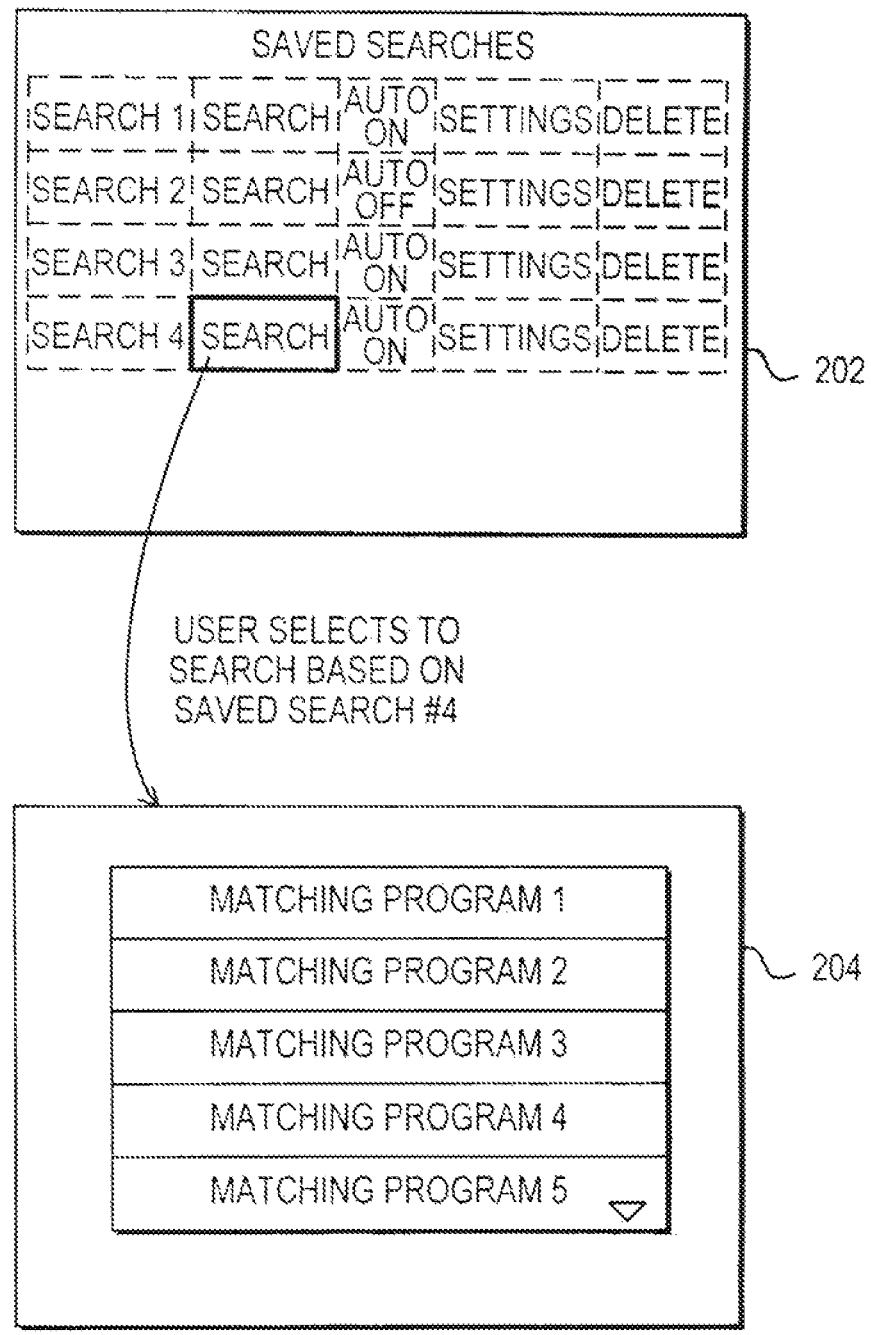
FIG. 12 is a diagram of an illustrative sequence of illustrative display screens for searching for program listings based on a saved search in accordance with the present invention.

Illustrative saved searches display screen 202 and illustrative related-program find display screen 204 of FIG. 12 may be provided based on the illustrative steps of FIG. 11. Saved searches display screen 202 may include a list of saved searches and corresponding options, including a search option, for each saved search. The program guide may display related program find display screen 204 when the users selects the search option for Search #4. Related program find display screen 204 may include a list of current program listings based on the user-configured search parameters for Search #4.

Figure 13:
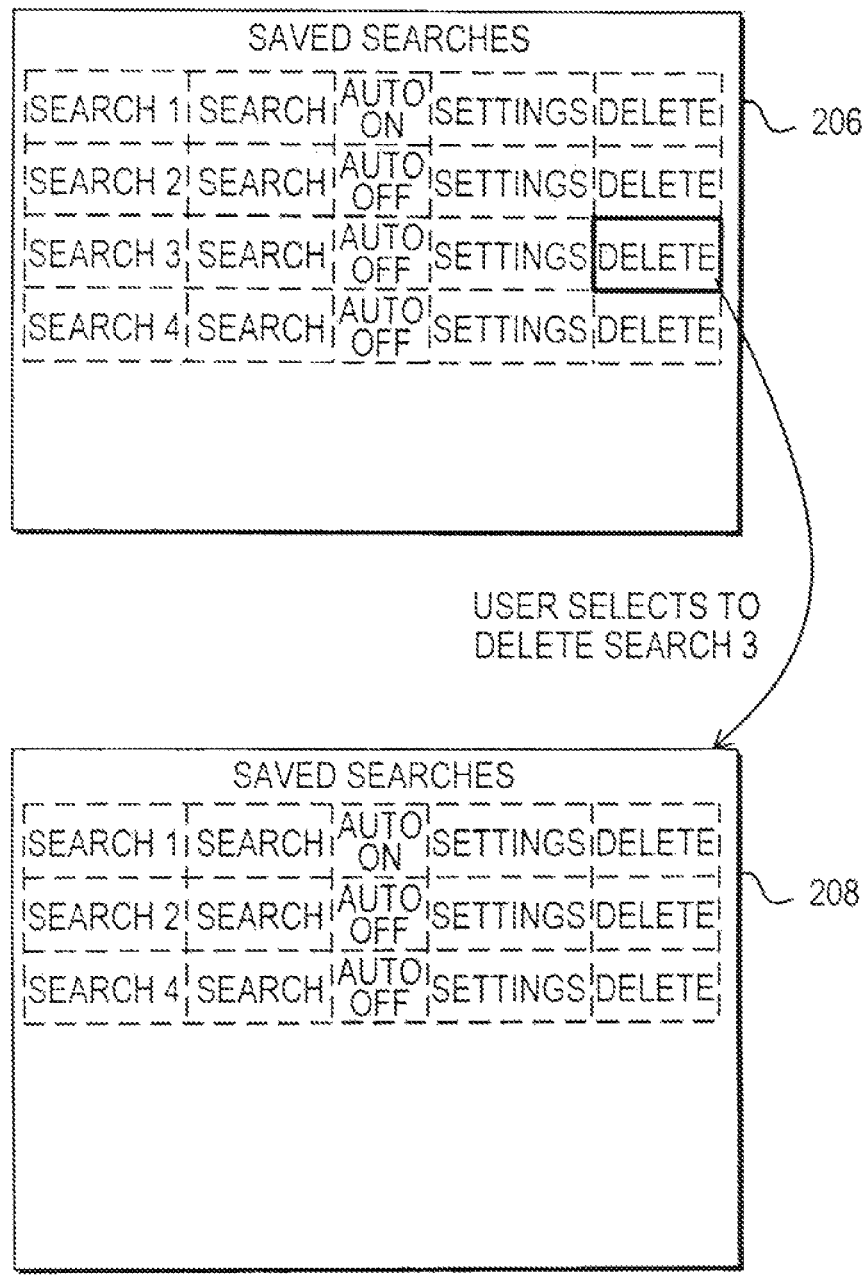
FIG. 13 is a diagram of an illustrative sequence of illustrative display screens for deleting a saved search in accordance with the present invention.

Illustrative saved searches display screens 206 and 208 of FIG. 13 may be provided based on the illustrative steps of FIG. 11. The program guide may display saved searches display screen 206 that includes a delete option for Search #3. The program guide may display saved searches display screen 208 that does not include Search #3 when the user selects the delete option for Search #3.

Figure 14:
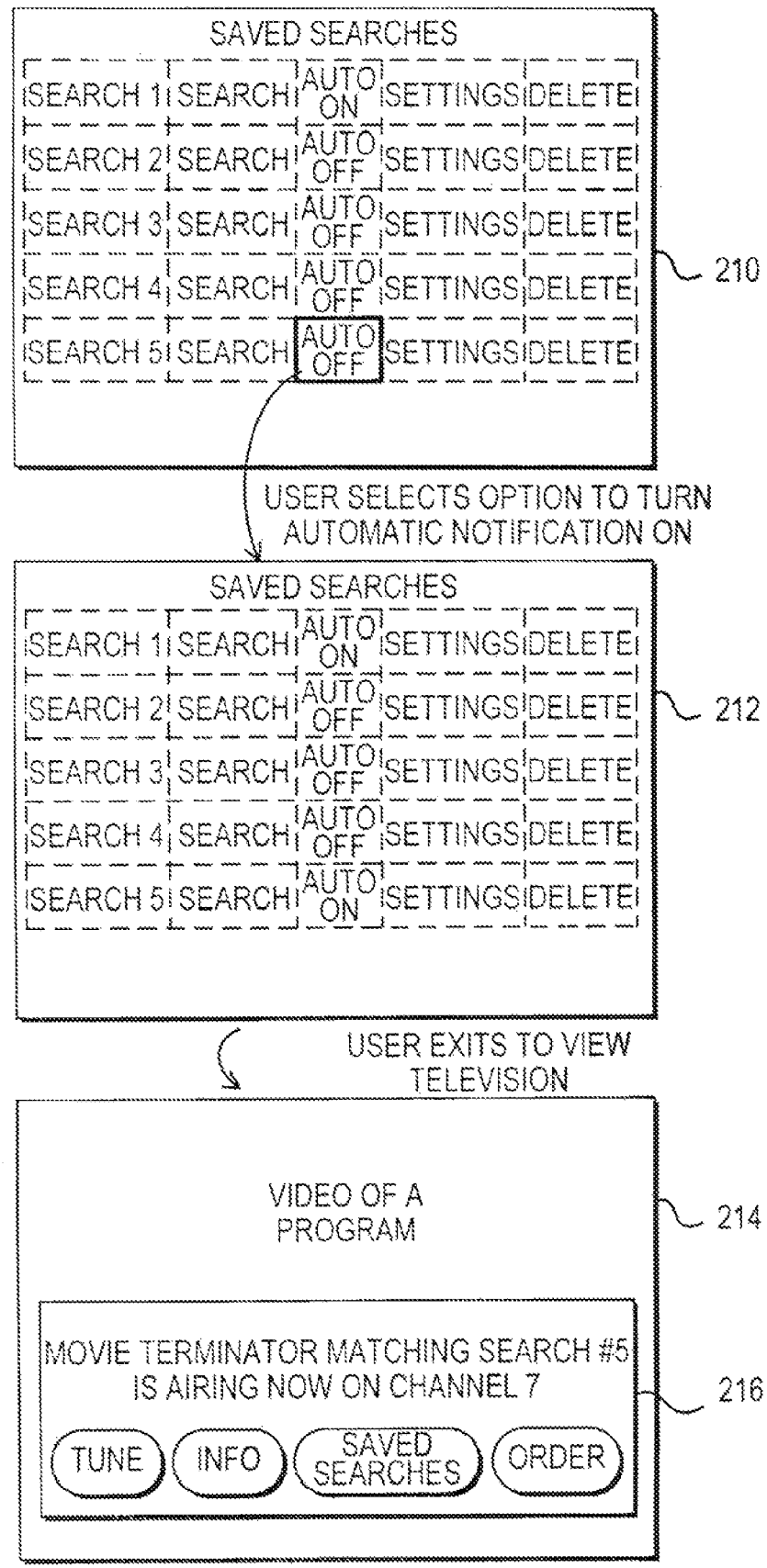
FIG. 14 is a diagram of an illustrative sequence of illustrative display screens for providing an automatic notification of a program matching a saved search in accordance with the present invention.

Illustrative display screen 214 and illustrative saved searches display screens 210 and 212 of FIG. 14 may be provided based on the illustrative steps of FIG. 11. The program guide may display saved searches display screen 210 that includes an automatic notification option for saved searches including Search #5. The as notification option for search #5 may initially be off. The program guide may display saved searches display screen 212 that includes an indication that the automatic notification for Search #5 is on when the user selects the automatic notification option for Search #5 from display screen 210. After the user exits saved searches display screen 212 and resumes watching television, the program guide may display automatic notification overlay 216 in display screen 214 when the program guide locates a program (e.g., the movie Terminator) using the user-configured search parameters for Search #5. If desired, the program guide may provide a notification display screen for the located program. The notification may be displayed when the program is about to air or is airing. The overlay 216 may include a tune option (for tuning to the channel airing that program), an information option (for display further information on that program), a saved searches option (for displaying a saved searches display screen), an order option (for ordering programs), etc.

Figure 15:
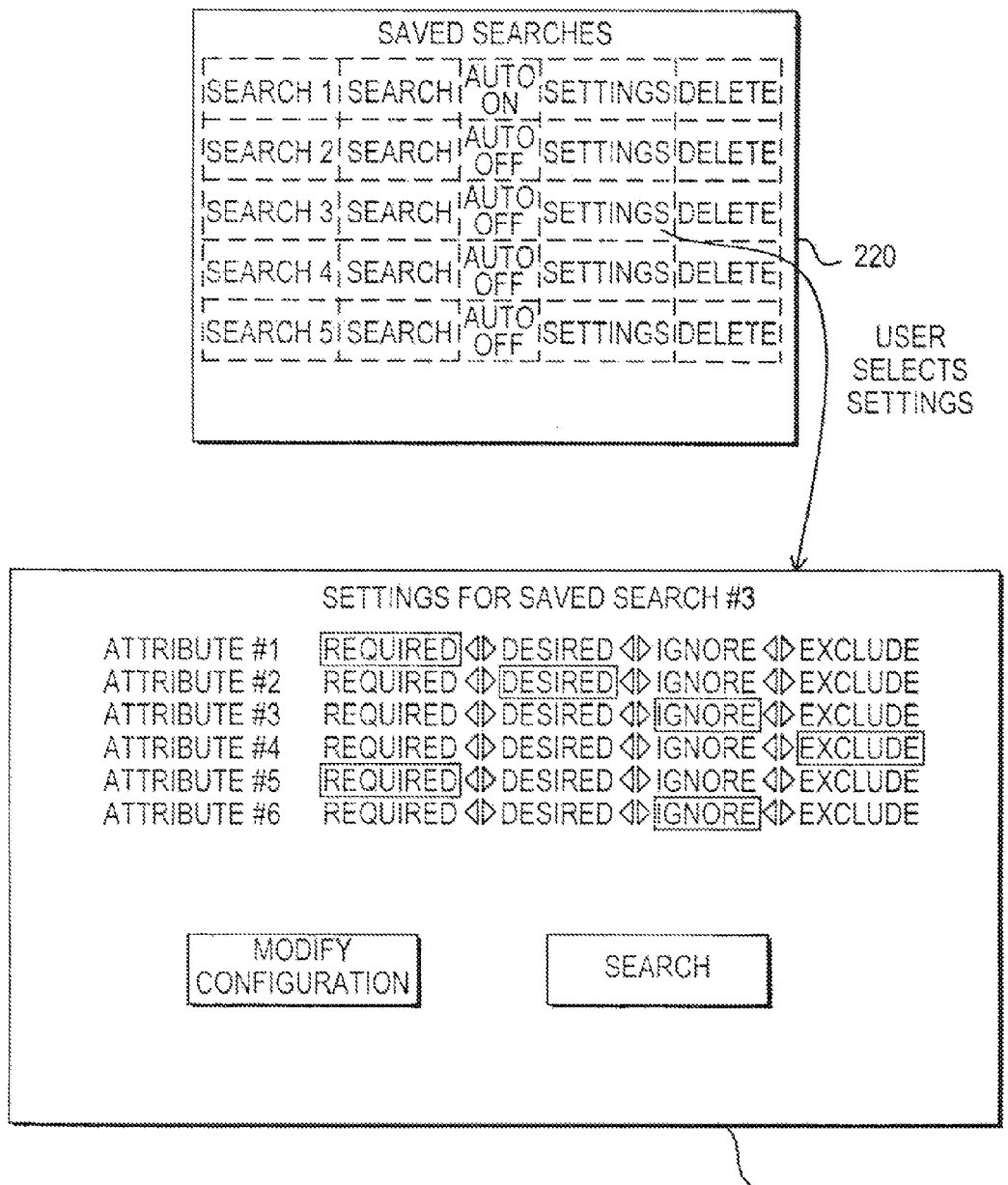
FIG. 15 is a diagram of an illustrative sequence of illustrative display screens for displaying search parameters for a saved search in accordance with the present invention.

Illustrative saved searches display screen 220 and illustrative saved search configuration display screen 222 of FIG. 15 may be provided used on the illustrative steps of FIG. 11. The program guide may display saved searches display screen 220 having an option that provides the user with an opportunity to view search parameters for saved searches. The program guide may display saved search configuration display screen 222 for Search #3 when the user selects the option to view search parameters for Search #3. Saved search configuration display screen 222 may display the saved user-configured search parameters for Search #3, a modify configuration option (to allow the user to adjust the search parameters), and a search option (to search the current program listings based on the user-configured search parameters). If desired, the program guide may provide the user with an opportunity to modify the settings on this screen by highlighting and changing them, rather than having to first select a "modify" option.

Figure 16:
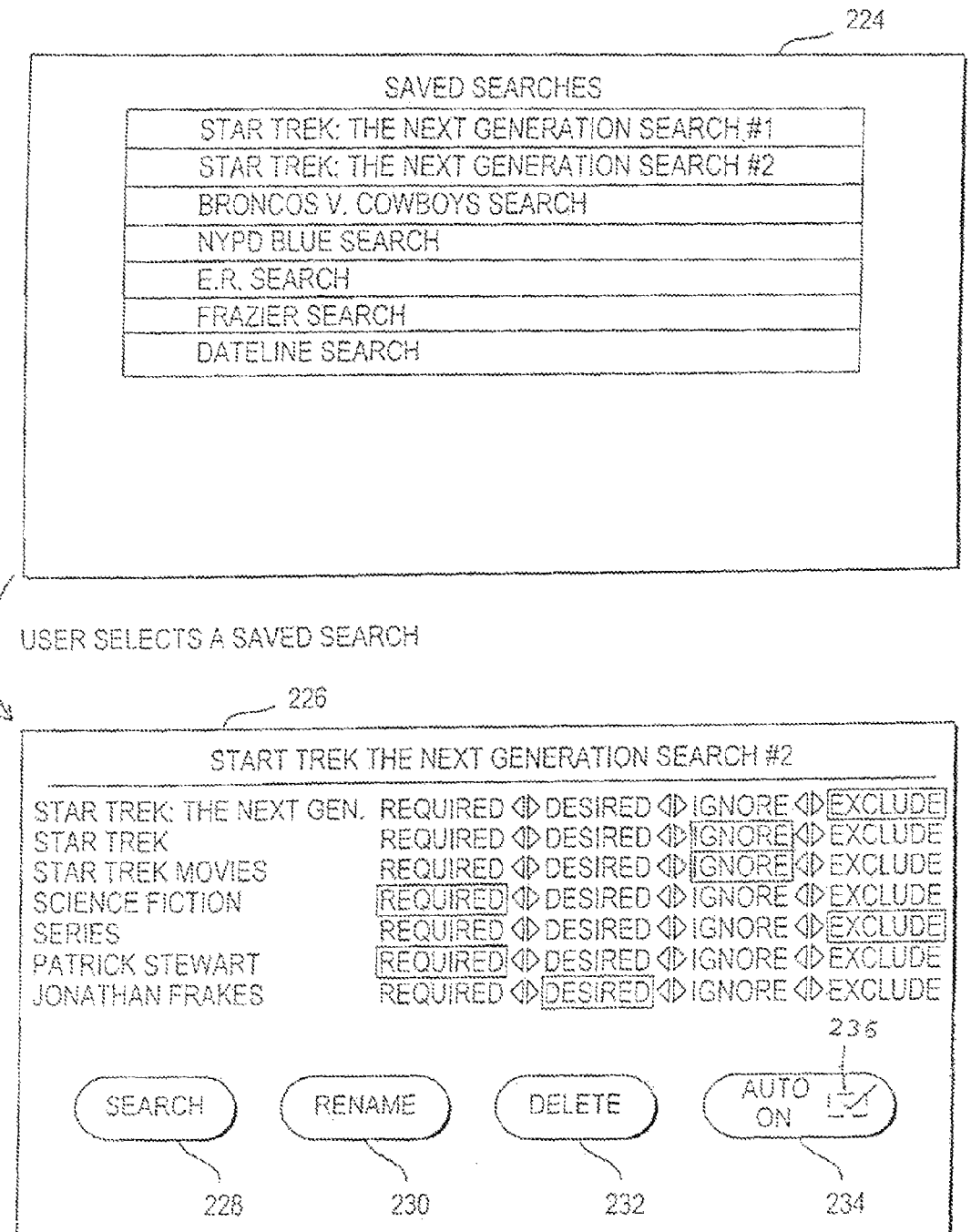
FIG. 16 is a diagram of an illustrative sequence of illustrative display screens for providing save search features in accordance with the present invention.

Illustrative saved searches display screen 224 and illustrative saved search configuration display screen 226 of FIG. 16 may be provided based on the illustrative steps of FIG. 11. The program guide may display saved searches display screen 224 that includes a list of saved searches when a user selects a saved searches option (e.g., saved searches option 182 of FIG. 10b). The program guide may display saved search configuration display screen 226 when the user selects a saved search from saved searches display screen 224. Saved search configuration display screen 226 may include on-screen search settings for the selected saved search. The program guide may provide the user with an opportunity to navigate to any of the settings and to modify them. Saved search configuration, display screen 226 may include search option 228 that when selected, causes the program guide to display a list of matching programs, rename option 230 that allows the user to enter a name (or modify the name) for the selected saved search, delete option 232 that when selected, deletes the selected save search, automatic notification option 234 that provides an automatic notification of programs matching the selected saved search, etc. Automatic Notification option 234 may include an indicator 236 to indicate that option 234 is on.

The foregoing is merely illustrative of the principles of this invention and various modifications can be made by those skilled in the art without departing from the scope and spirit of the invention.

What is claimed is:

1. A method for searching for programs using an interactive system, the method comprising:
generating for display a video on user equipment;
in response to receiving a first user input while the video is being displayed:
receiving, from a server remote to the user equipment, a list of a plurality of attributes of the displayed video; and
generating for display the list of the plurality of attributes of the displayed video;
in response to receiving a second user input, assigning various importance levels to one or more of the attributes of the displayed video;
in response to receiving a third user input, selecting one or more attributes of the list to include in determining a list of one or more programs;
in response to receiving a fourth user input, selecting one or more attributes of the list to exclude in determining the list of one or more programs;
determining the list of one or more programs, each program having at least one attribute which matches the selected one or more attributes of the displayed video and excluding, from the list of one or more programs, programs that have the one or more excluded attributes of the displayed video, wherein the determining is further based on the assigned importance levels;
saving the selected one or more attributes of the list to include and the selected one or more attributes of the list to exclude as a user-configured search parameter list; and
automatically notifying the user by generating for display the determined list of one or more programs, wherein the determined list is sorted according to the assigned importance levels.

2. A method for saving attributes for use in a search at a later time, the method comprising:
generating for display a video on user equipment;
receiving, from a server remote to the user equipment, a plurality of attributes of the displayed video;
in response to receiving a first user input while the video is being displayed,
generating for display identifiers for each of the plurality of attributes of the displayed video;
in response to receiving a second user input, selecting a first attribute of the plurality of attributes;
in response to receiving the second user input, saving the selected first attribute in storage circuitry; and
in response to receiving a user request to view saved attributes, retrieving the saved selected first attribute from the storage circuitry for presentation of the saved selected first attribute to the user for performing a search based on the first attribute.

3. The method of claim 2, wherein the plurality of attributes includes information associated with at least one of title, actor, duration, genre, channel, rating, director, production year, and series title.

4. The method of claim 2, further comprising:
after receiving the second user input, removing from display the identifiers, wherein the user request to view saved attributes is received after the removing;
and
generating for display an identifier of the selected first attribute in response to receiving the user request to view saved attributes.

5. The method of claim 4, further comprising determining a media asset based on the selected first attribute retrieved from the storage circuitry.

6. The method of claim 2, wherein the selected first attribute is saved in a save-file in the storage circuitry.

7. The method of claim 6, further comprising deleting the save-file from the storage circuitry.

8. The method of claim 2, further comprising
performing the search at the later time using the selected first attribute;
automatically generating for display a notification for a media asset located from the search.

9. The method of claim 2, further comprising:
in response to receiving a third user input, assigning an importance level to a second attribute of the plurality of attributes of the displayed video.

10. The method of claim 9, further comprising:
determining a plurality of media assets based on the second attribute of the plurality of attributes; and
automatically generating for display media asset identifiers of the determined plurality of media assets, wherein the media asset identifiers are sorted according to assigned importance level.

11. The method of claim 2, further comprising:
in response to receiving a fourth user input, selecting a third attribute of the plurality of attributes to include in determining a plurality of media assets; and
in response to receiving a fifth user input, selecting a fourth attribute of the plurality of attributes to exclude in determining the plurality of media assets.

12. A method for sorting media assets, the method comprising:
  generating for display, with processing circuitry, a video on user equipment;
  receiving, from a server remote to the user equipment, a plurality of attributes of the displayed video;
  in response to receiving a first user input while the video is being displayed, generating for display identifiers for each the plurality of attributes of the displayed video;
  in response to receiving a second user input, assigning a first importance level to include a first attribute of the plurality of attributes of the displayed video in determining a plurality of media assets;
  in response to receiving a third user input, assigning a second importance level to exclude a second attribute of the plurality of attributes of the displayed video in determining the plurality of media assets;
  determining the plurality of media assets based on the first importance level to include the first attribute and the second importance level to exclude the second attribute; and
  automatically generating for display media asset identifiers of the determined plurality of media assets, wherein the plurality of media assets identifiers is sorted according to the assigned importance levels.

13. The method of claim 12, further comprising generating for display an information display screen that contains information related to a media asset of the determined plurality of media assets in response to a user selection of the media asset identifier.

14. The method of claim 12, further comprising:
  in response to receiving a fourth user input, selecting a third attribute of the plurality of attributes; and
  saving the selected third attribute for use in a search at a later time.

15. A system for searching for programs using an interactive system, the system comprising:
  user input interface circuitry configured to:
    receive a first user input while a video is being displayed;
    receive a second user input;
    receive a third user input; and
    receive a fourth user input;
  processing circuitry configured to:
    generate for display the video on user equipment;
    in response to receiving the first user input:
      receive, from a server remote to the user equipment, a list of a plurality of attributes of the displayed video; and
      generate for display the plurality of attributes of the displayed video;
    in response to receiving the second user input, assign various importance levels to one or more of the attributes of the displayed video;
    in response to receiving the third user input, select one or more attributes of the list to include in determining a list of one or more programs;
    in response to receiving the fourth user input, select one or more attributes of the list to exclude in determining the list of one or more programs;
    determine the list of one or more programs, each program having at least one attribute which matches the selected one or more attributes of the displayed video and excluding, from the list of one or more programs, programs that have the one or more excluded attributes of the displayed video, wherein the determining is further based on the assigned importance levels; and
    automatically notify the user by generating for display the determined list of one or more programs, wherein the determined list is sorted according to the assigned importance levels; and
  storage circuitry configured to:
    save the selected one or more attributes of the list to include and the selected one or more attributes of the list to exclude as a user-configured search parameter list.

16. A system for saving attributes for use in a search at a later time, the system comprising:
  user input interface circuitry configured to:
    receive a first user input while a video is being displayed;
    receive a second user input; and
    receive a user request to view saved attributes;
  processing circuitry configured to:
    generate for display the video on user equipment;
    in response to receiving the first user input:
      receive, from a server remote to the user equipment, a plurality of attributes of the displayed video; and
      generate for display identifiers for each of the plurality of attributes of the displayed video; and
    in response to receiving the second user input, select, for saving in storage circuitry, a first attribute of the plurality of attributes with the processing circuitry,
  wherein the storage circuitry is configured to:
    save the selected first attribute;
  wherein the processing circuitry is further configured to
    in response to receiving the user request to view saved attributes, retrieve the saved selected first attribute from the storage circuitry for presentation of the saved selected first attribute to the user for performing a search based on the first attribute.

17. The system of claim 16, wherein the plurality of attributes includes information associated with at least one of title, actor, duration, genre, channel, rating, director, production year, and series title.

18. The system of claim 16, wherein the processing circuitry is further configured to:
  after receiving the second user input, remove from display the identifiers, wherein the user request to view saved attributes is received after the removing; and
  generate for display an identifier of the selected first attribute in response to receiving the user request to view saved attributes.

19. The system of claim 18, wherein the processing circuitry is further configured to determine a media asset based on the selected first attribute retrieved from the storage circuitry.

20. The method of claim 16, wherein the selected first attribute is saved in a save-file in the storage circuitry.

21. The system of claim 20, wherein the processing circuitry is further configured to delete the save-file in the storage circuitry.

22. The system of claim 16, wherein the processing circuitry is further configured to automatically generate for display a notification for a media asset located using the selected first attribute.

23. The system of claim 16, wherein the user input interface circuitry is further configured to:
  receive a third user input; and
  wherein the processing circuitry is further configured to:
    in response to receiving the third user input, assign an importance level to a second attribute of the plurality of attributes of the displayed video.

24. The system of claim 23, wherein the processing circuitry is further configured to:
- determine a plurality of media assets based on the second attribute of the plurality of attributes; and
- automatically generate for display media asset identifiers of the determined plurality of media assets, wherein the plurality of media assets is sorted according to assigned importance levels.

25. The system of claim 16, wherein the user input interface circuitry is further configured to:
- receive a fourth user input; and
- receive a fifth user input; and wherein the processing circuitry is further configured to:
  - in response to receiving the fourth user input, select one of the plurality of attributes to include in determining a plurality of media assets; and
  - in response to receiving the fifth user input, select one of the plurality of attributes to exclude in determining the plurality of media assets.

26. A system for sorting media assets, the system comprising:
- user input interface circuitry configured to:
  - receive a first user input while a video is being displayed; and
  - receive a second user input and a third user input; and
- processing circuitry configured to:
  - generate for display a video on user equipment;
  - in response to receiving the first user input:
    - receive, from a server remote to the user equipment, a plurality of attributes of the currently displayed video; and
    - generate for display identifiers of the plurality of attributes of the displayed video;
  - in response to receiving the second user input, assign a first importance level to include a first attribute of the plurality of attributes of the displayed video in determining a plurality of media assets;
  - in response to receiving the third user input, assign a second importance level to exclude a second attribute of the plurality of attributes of the displayed video in determining the plurality of media assets;
  - determine a plurality of media assets based on the first importance level to include the first attribute and the second importance level to exclude the second attribute; and
  - automatically generate for display media asset identifiers of the determined plurality of media assets, wherein the plurality of media assets identifiers is sorted according to the assigned importance levels.

27. The system of claim 26, wherein the processing circuitry is further configured to provide the user with an opportunity to select any of the determined plurality of media assets.

28. The system of claim 26, wherein the processing circuitry is further configured to generate for display an information display screen that contains information related to a media asset of the determined plurality of media assets in response to a user selection of the media asset.

29. The system of claim 26, wherein the user input interface circuitry is further configured to:
- receive a fourth use input; and wherein the processing circuitry is further configured to:
- in response to receiving the fourth user input, select a third attribute of the plurality of attributes; and
- save the selected third attribute for use in a search at a later time.

* * * * *